US011177736B2

(12) United States Patent
Furuya

(10) Patent No.: US 11,177,736 B2
(45) Date of Patent: Nov. 16, 2021

(54) CIRCUIT DEVICE, POWER SUPPLY CIRCUIT, OSCILLATOR, ELECTRONIC APPARATUS, AND VEHICLE

(71) Applicant: SEIKO EPSON CORPORATION, Tokyo (JP)

(72) Inventor: Yasunari Furuya, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 73 days.

(21) Appl. No.: 16/686,299

(22) Filed: Nov. 18, 2019

(65) Prior Publication Data

US 2020/0161972 A1 May 21, 2020

(30) Foreign Application Priority Data

Nov. 19, 2018 (JP) .............................. JP2018-216086

(51) Int. Cl.
*H02M 3/157* (2006.01)
*G05F 1/46* (2006.01)
*H02M 1/00* (2006.01)

(52) U.S. Cl.
CPC .............. *H02M 3/157* (2013.01); *G05F 1/46* (2013.01); *H02M 1/0012* (2021.05)

(58) Field of Classification Search
CPC ...... H02M 3/157; H02M 1/0012; H02M 1/08; H02M 3/00; G05F 1/46; H03L 7/093; H03L 1/00; H03L 5/02
See application file for complete search history.

(56) References Cited

U.S. PATENT DOCUMENTS

| 9,697,065 B1* | 7/2017 | Abhishek ................ G06F 13/00 |
| 2007/0103838 A1 | 5/2007 | Kimura |
| 2007/0296388 A1 | 12/2007 | Sasaki et al. |
| 2018/0138920 A1 | 5/2018 | Sharma et al. |
| 2020/0125126 A1* | 4/2020 | Gupta ....................... G05F 1/59 |

FOREIGN PATENT DOCUMENTS

| JP | H08-272461 A | 10/1996 |
| JP | 2001-195138 A | 7/2001 |
| JP | 2005-284849 A | 10/2005 |
| JP | 2007-128457 A | 5/2007 |
| JP | 2007-328680 A | 12/2007 |
| JP | 2013-175011 A | 9/2013 |
| JP | 2016-134735 A | 7/2016 |
| JP | 2018-078568 A | 5/2018 |

* cited by examiner

*Primary Examiner* — Adolf D Berhane
(74) *Attorney, Agent, or Firm* — Rankin, Hill & Clark LLP

(57) ABSTRACT

A circuit device includes a digital circuit, a digital power supply circuit that supplies a digital power supply voltage to the digital circuit, an analog circuit, and an analog power supply circuit that supplies an analog power supply voltage to the analog circuit. The analog power supply circuit has a first mode and a second mode as operation modes, the first mode is a mode in which activation of power supply is faster than that in the second mode, and the second mode is a mode in which power supply is performed with lower noise than that in the first mode.

14 Claims, 13 Drawing Sheets

… (1)

CIRCUIT DEVICE, POWER SUPPLY CIRCUIT, OSCILLATOR, ELECTRONIC APPARATUS, AND VEHICLE

The present application is based on, and claims priority from JP Application Serial Number 2018-216086, filed Nov. 19, 2018, the disclosure of which is hereby incorporated by reference herein in its entirety.

BACKGROUND

1. Technical Field

The present disclosure relates to a circuit device, power supply circuit, oscillator, electronic apparatus, and vehicle.

2. Related Art

JP-A-2016-134735 discloses an oscillator including a digital circuit, an analog circuit, and an oscillation circuit. In the oscillator, noise attenuation circuits realized using regulator circuits and filter circuits are placed in a signal path between a power supply node of the digital circuit and a power supply node of the oscillation circuit, a signal path between the power supply node of the digital circuit and a power supply node of the analog circuit, and a signal path between the power supply node of the oscillation circuit and the power supply node of the analog circuit. According to the oscillator, noise generated in one of the digital circuit, the analog circuit, and the oscillation circuit is attenuated by the noise attenuation circuit and an influence by the noise on the oscillation signal may be reduced.

Fast activation and less power supply fluctuation due to sharp load current fluctuation are required for digital power supply for digital circuit supplied to a digital circuit. On the other hand, power supply output with low noise is required for analog power supply for analog circuit supplied to an analog circuit. Accordingly, the noise attenuation circuits as described in JP-A-2016-134735 are provided for low noise of the analog power supply. However, only the low noise is insufficient for the analog power supply for analog circuit, a delay of activation of power supply is not desirable.

SUMMARY

An aspect of the present disclosure relates to a circuit device including a digital circuit, a digital power supply circuit that supplies a digital power supply voltage to the digital circuit, an analog circuit, and an analog power supply circuit that supplies an analog power supply voltage to the analog circuit, wherein the analog power supply circuit has a first mode and a second mode as operation modes, the first mode is a mode in which activation of power supply is faster than that in the second mode, and the second mode is a mode in which power supply is performed with lower noise than that in the first mode.

Another aspect of the present disclosure relates to a power supply circuit that supplies a power supply voltage, including an amplifier circuit having a first input terminal to which a reference voltage is input, a transistor provided between a first power supply node and an output node of the power supply voltage, a lowpass filter provided between a node of an output terminal of the amplifier circuit and a node of a gate of the transistor, a switch provided in parallel with the lowpass filter between the node of the output terminal of the amplifier circuit and the node of the gate of the transistor, and a voltage divider circuit provided between the output node of the power supply voltage and a second power supply node and outputting a voltage formed by division of the power supply voltage to a second input terminal of the amplifier circuit.

DESCRIPTION OF EXEMPLARY EMBODIMENTS

As below, embodiments will be explained. The following embodiments do not unduly limit the contents of the appended claims. Further, not all of the configurations described in the embodiments are essential component elements.

1. Circuit Device

Figure 1:
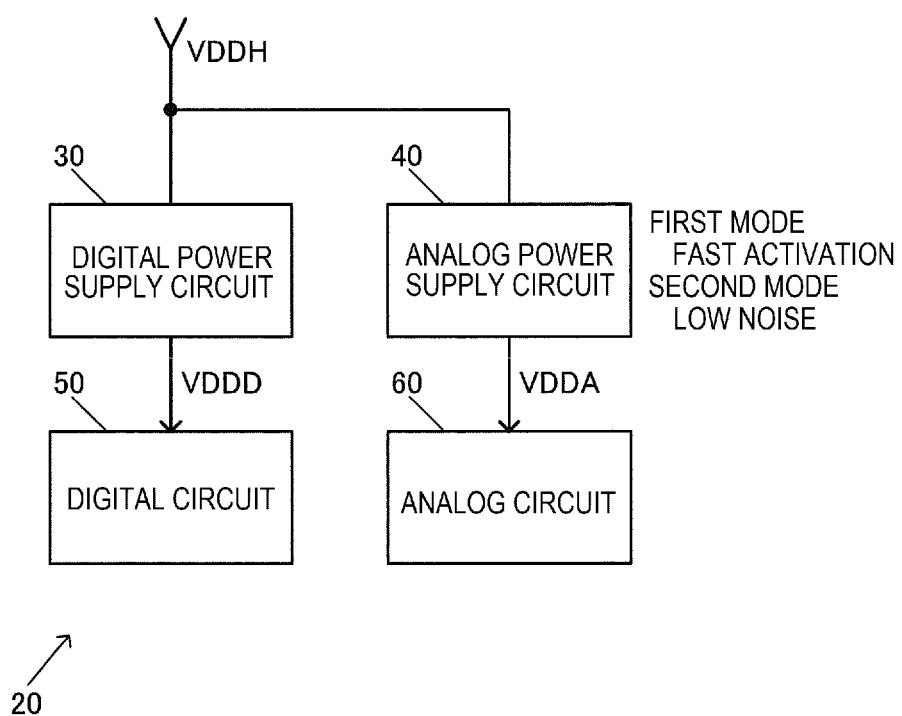
FIG. 1 shows a configuration example of a circuit device of an embodiment.

FIG. 1 shows the configuration example of the circuit device 20 of the embodiment. The circuit device 20 includes a digital power supply circuit 30, an analog power supply circuit 40, a digital circuit 50, and an analog circuit 60. The circuit device 20 is an integrated circuit device called IC (Integrated Circuit) and digital-analog mixed IC.

The digital power supply circuit 30 is a power supply circuit for digital circuit and supplies a digital power supply voltage VDDD to the digital circuit 50. The digital power supply voltage VDDD is a power supply voltage for digital circuit. For example, the digital power supply circuit 30 has a power supply circuit such as a regulator circuit, and generates and supplies the digital power supply voltage VDDD based on a power supply voltage VDDH to the digital circuit 50. For example, a voltage formed by regulation of the power supply voltage VDDH is supplied to the digital circuit 50 as the digital power supply voltage VDDD. The power supply voltage VDDH is e.g. a power supply voltage input from outside of the circuit device 20. Note that the power supply circuit generating the power supply voltage VDDH may be provided inside of the circuit device 20.

The analog power supply circuit 40 is a power supply circuit for analog circuit, and supplies an analog power supply voltage VDDA to the analog circuit 60. The analog power supply voltage VDDA is a power supply voltage for analog circuit. For example, the analog power supply circuit 40 has a power supply circuit such as a regulator circuit, and generates and supplies the analog power supply voltage VDDA based on the power supply voltage VDDH to the analog circuit 60. For example, a voltage formed by regulation of the power supply voltage VDDH is supplied to the analog circuit 60 as the analog power supply voltage VDDA.

The digital circuit 50 includes e.g. a logical circuit element such as a NAND, NOR, inverter, or flip-flop. For example, a digital signal is input to the circuit, and the circuit outputs a digital signal. The digital circuit 50 may be realized using e.g. automatic placement and routing such as a gate array or standard cell.

The analog circuit 60 includes e.g. an analog circuit element such as an operational amplifier, resistor, or capacitor. For example, an analog signal is input to the circuit and the circuit outputs an analog signal. The analog circuit 60 may be realized using e.g. a macroblock in which a plurality of analog circuit elements are placed. Note that the analog circuit 60 may include a logical circuit element as a part of the circuit.

The analog power supply circuit 40 has a first mode and a second mode as operation modes. That is, the analog power supply circuit 40 operates in the first mode when the operation mode is set to the first mode and operates in the second mode when the operation mode is set to the second mode. Note that there may be three or more operation modes. The first mode is a mode in which activation of power supply is faster than that in the second mode. On the other hand, the second mode is a mode in which power is supplied with lower noise than that in the first mode.

For example, when set in the first mode, compared to the case where the circuit is set in the second mode, the analog power supply circuit 40 is activated faster and starts power supply of the analog power supply voltage VDDA to the analog circuit 60. For example, a time after the power supply voltage VDDH rises and before the analog power supply voltage VDDA reaches a target voltage is faster in the first mode than that in the second mode. On the other hand, when set in the second mode, compared to the case where the circuit is set in the first mode, the analog power supply circuit 40 supplies the analog power supply voltage VDDA to the analog circuit 60 with lower noise. For example, when the second mode is set, compared to the case where the first mode is set, the noise level of the analog power supply voltage VDDA supplied by the analog power supply circuit 40 is lower. For example, in the second mode, the analog power supply circuit 40 supplies the analog power supply voltage VDDA subjected to filtering such as lowpass filtering to the analog circuit 60, however, in the first mode, supplies the analog power supply voltage VDDA not subjected to the filtering to the analog circuit 60.

As described above, in the embodiment, the analog power supply circuit 40 can perform both operations in the first mode of power supply with fast activation and the second mode of power supply with low noise. Therefore, in a situation where the power supply with fast activation is required more than that with low noise, the analog power supply circuit 40 may address the situation by operating in the first mode. As an example, in a given period after the supply of the power supply voltage VDDH is started and the power supply voltage VDDH rises, the analog power supply circuit 40 is set in the first mode, and thereby, the power supply of the analog power supply circuit 40 is activated fast like that of the digital power supply circuit 30 and the analog power supply voltage VDDA is supplied to the analog circuit 60. Thereby, a time until the analog circuit 60 performs a desired analog operation may be shortened. On the other hand, in a situation where the power supply with low noise is required more than that with fast activation, the analog power supply circuit 40 may address the situation by operating in the second mode. As an example, the analog circuit 60 is activated by e.g. power supply in the first mode or the like and the desired analog operation is enabled, and then, the analog power supply circuit 40 may be operated in the second mode so as to supply the low-noise analog power supply voltage VDDA to the analog circuit 60. Thereby, the analog circuit 60 operates based on the low-noise analog power supply voltage VDDA and the low-noise analog operation of the analog circuit 60 may be realized. For example, the analog circuit 60 can output a low-noise analog signal or the like.

For example, the digital power supply circuit 30 may be activated fast with less power supply fluctuation due to sharp load current fluctuation. On the other hand, the analog power supply circuit 40 can output power with low noise and is used for a circuit required for low noise such as e.g. an oscillation circuit, which will be described later. In order to realize low noise characteristics, a lowpass filter having a large time constant or the like is provided, and thereby, the band of the analog power supply circuit 40 is extremely lowered. However, when the band is lowered as described above, a problem that the activation time until voltage stabilization is long arises. Further, the band is lower, and thereby, when a sharp load current change occurs after the start of operation in the analog circuit 60 supplied with power, a problem that the time until voltage stabilization is very long arises.

In this regard, in the embodiment, the analog power supply circuit 40 has the first mode as the fast activation mode and the second mode as the low noise mode. The processing of switching between the first mode and the second mode is executed by an external control circuit. Then, in the first mode, the analog power supply circuit 40 is activated fast by turning off the lowpass filter provided inside, for example. Further, when the band is higher and a sharp load current is generated in the analog circuit 60, the time until voltage stabilization may be also shortened. Then, in the second mode, the analog power supply circuit 40 can supply power with low noise by turning on the lowpass filter provided inside, for example. Thereby, power can be appropriately supplied to a circuit required for low noise such as an oscillation circuit.

In the embodiment, the analog power supply circuit 40 supplies the analog power supply voltage VDDA to the analog circuit 60 in the first mode, and then, supplies the analog power supply voltage VDDA to the analog circuit 60 in the second mode. As an example, after the power supply voltage VDDH is turned on and rises, the analog power supply circuit 40 is set in the first mode and activated fast, and supplies the analog power supply voltage VDDA as the target voltage to the analog circuit 60 in a shorter time. Concurrently, for example, the digital power supply circuit 30 is also activated fast and starts the supply of the digital power supply voltage VDDD to the digital circuit 50. Then, the analog power supply circuit 40 supplies the analog power supply voltage VDDA to the analog circuit 60 in the first mode, and then, the operation mode is switched to the second mode and the circuit supplies the analog power supply voltage VDDA to the analog circuit 60 in the second mode. That is, the circuit supplies the analog power supply voltage VDDA with low noise than that in the first mode to the analog circuit 60. In this manner, the analog power supply circuit 40 is set in the first mode and may start supply of the analog power supply voltage VDDA in a shorter time. After the start of supply of the analog power supply voltage VDDA, the analog power supply circuit 40 is set in the second mode and may supply the low-noise analog power supply voltage VDDA to the analog circuit 60. Thereby, the low-noise analog operation of the analog circuit 60 may be realized.

Further, in the embodiment, the digital power supply circuit 30 supplies the digital power supply voltage VDDD to the digital circuit 50, and then, the operation mode of the analog power supply circuit 40 is switched from the first mode to the second mode. For example, after rise of the power supply voltage VDDH, the digital power supply circuit 30 supplies the digital power supply voltage VDDD to the digital circuit 50. Thereby, the digital circuit 50 executes various kinds of control processing including control processing of the analog circuit 60. Then, the operation mode of the analog power supply circuit 40 is switched from the first mode to the second mode, and supply of the low-noise analog power supply voltage VDDA to the analog circuit 60 by the analog power supply circuit 40 is started. Specifically, after rise of the power supply voltage VDDH by external power supply, supply of the digital power supply voltage VDDD to the digital circuit 50 by the digital power supply circuit 30 is started, and the analog power supply circuit 40 is set in the first mode and activated fast and starts supply of the analog power supply voltage VDDA. Then, the operation mode of the analog power supply circuit 40 is switched from the first mode to the second mode, and the low-noise analog power supply voltage VDDA is supplied to the analog circuit 60. In this manner, the digital power supply voltage VDDD is supplied to the digital circuit 50, and thereby, control processing by the digital circuit 50 is enabled and the digital circuit 50 enabled to perform the control processing may execute control processing of switching the operation mode of the analog power supply circuit 40 from the first mode to the second mode or the like.

2. Detailed Configuration Example

Figure 2:
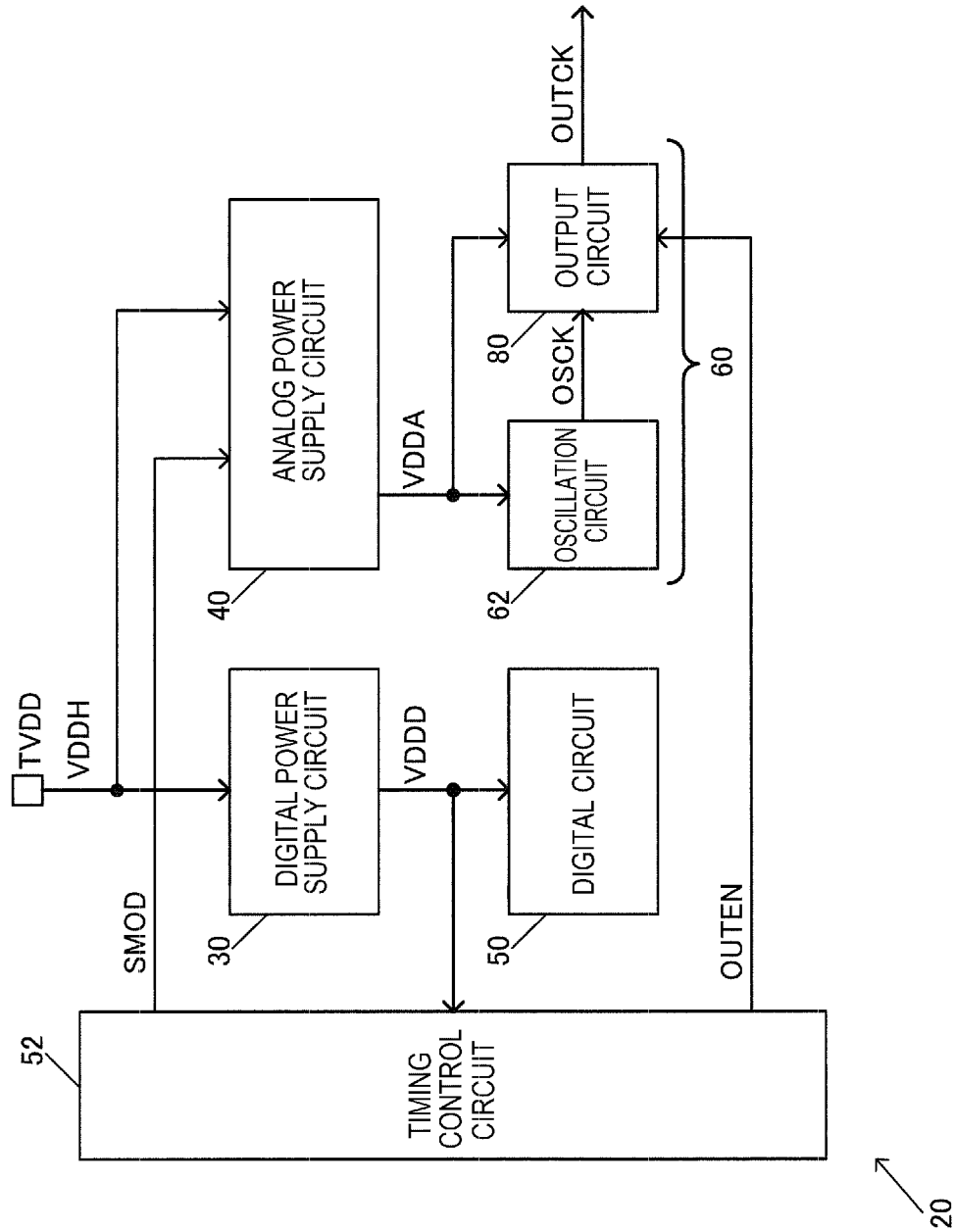
FIG. 2 shows a detailed first configuration example of the circuit device of the embodiment.

Next, a detailed example of the circuit device 20 of the embodiment will be explained. FIG. 2 shows the detailed first configuration example of the circuit device 20 of the embodiment. In FIG. 2, an oscillation circuit 62 and an output circuit 80 are provided as the analog circuit 60. The power supply voltage VDDH is externally supplied to the circuit device 20 via a power supply terminal TVDD. The power supply terminal TVDD is realized using e.g. an IC pad. Further, the circuit device 20 includes a timing control circuit 52 and the timing control circuit 52 outputs a mode setting signal SMOD to the analog power supply circuit 40. The switching between the first and second modes of the analog power supply circuit is performed based on the mode setting signal SMOD. Furthermore, the timing control circuit 52 outputs an output enable signal OUTEN to the output circuit 80 of the analog circuit 60. Note that the timing control circuit 52 is shown as another block than that of the digital circuit 50 in FIG. 2 for convenience of explanation, however, actually, the timing control circuit 52 is contained in the digital circuit 50.

Figure 13:
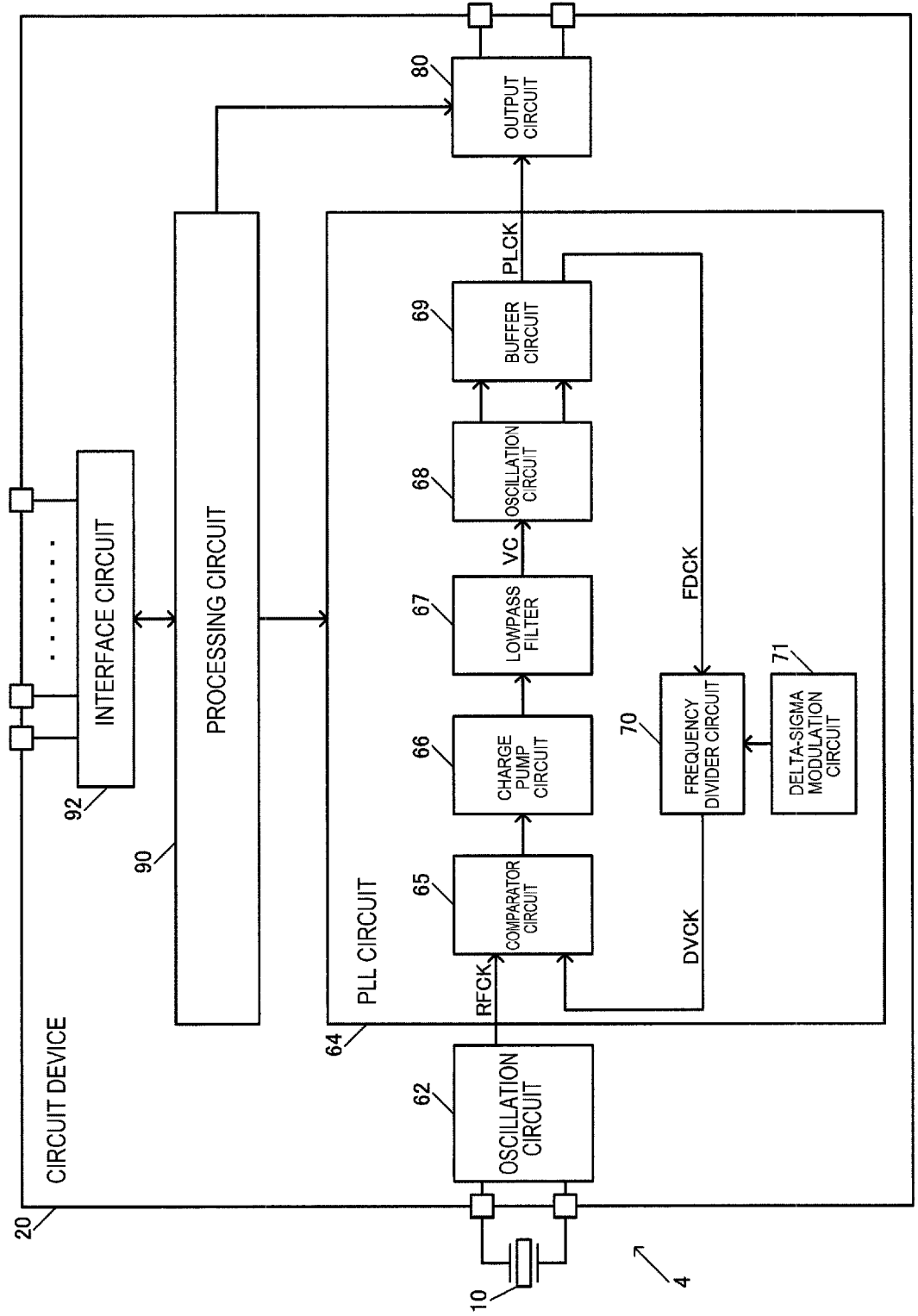
FIG. 13 shows a configuration example of an oscillator.

As described above, in FIG. 2, the analog circuit 60 includes the oscillation circuit 62 that generates an oscillation signal OSCK by oscillation. The oscillation signal OSCK is a clock signal generated by oscillation operation of the oscillation circuit 62. For example, as shown in FIG. 13, which will be described later, the oscillation circuit 62 generates the oscillation signal OSCK by oscillation operation using a vibrator 10 as a resonator. The output circuit 80 outputs a clock signal OUTCK based on the oscillation signal OSCK. For example, the clock signal OUTCK is output outside in various signal formats such as LVDS (Low Voltage Differential Signaling), PECL (Positive Emitter Coupled Logic), HCSL (High Speed Current Steering Logic), or differential CMOS (Complementary MOS).

Then, the analog power supply circuit 40 supplies the analog power supply voltage VDDA to the oscillation circuit 62 in the first mode, and then, supplies the analog power supply voltage VDDA to the oscillation circuit 62 in the second mode. For example, after rise of the power supply voltage VDDH, the analog power supply circuit 40 is activated fast in the first mode and starts supply of the analog power supply voltage VDDA to the oscillation circuit 62. For example, when set in the first mode, the circuit starts supply of the analog power supply voltage VDDA fast though the noise level is larger than that in the second mode. The first mode of fast activation is used, and thereby, the oscillation operation of the oscillation circuit 62 may be activated fast. For example, the digital power supply voltage VDDD is turned on and rises, and then, after a shorter period, the oscillation circuit 62 performs oscillation operation. Then, the operation mode is switched from the first mode to the second mode, and the analog power supply circuit 40 supplies the analog power supply voltage VDDA with lower noise than that in the first mode to the oscillation circuit 62. For example, the operation mode of the analog power supply circuit 40 is switched from the first mode to the second mode based on the mode setting signal SMOD from the timing control circuit 52. Thereby, the low-noise oscillation signal OSCK is output from the oscillation circuit 62, and the clock signal OUTCK output by the output circuit 80 based on the oscillation signal OSCK becomes a low-noise signal.

Note that, as shown in FIG. 2, also, the analog power supply voltage VDDA from the analog power supply circuit 40 is supplied to the output circuit 80, and the circuit operates. In this case, a power supply circuit for oscillation circuit and a power supply circuit for output circuit may be provided in the analog power supply circuit 40, and a first analog power supply voltage from the power supply circuit for oscillation circuit may be supplied to the oscillation circuit 62 and a second analog power supply voltage from the power supply circuit for output circuit may be supplied to the output circuit 80. In this case, the respective power supply circuit for oscillation circuit and power supply circuit for output circuit may be realized using e.g. regulator circuits or the like.

Figure 3:
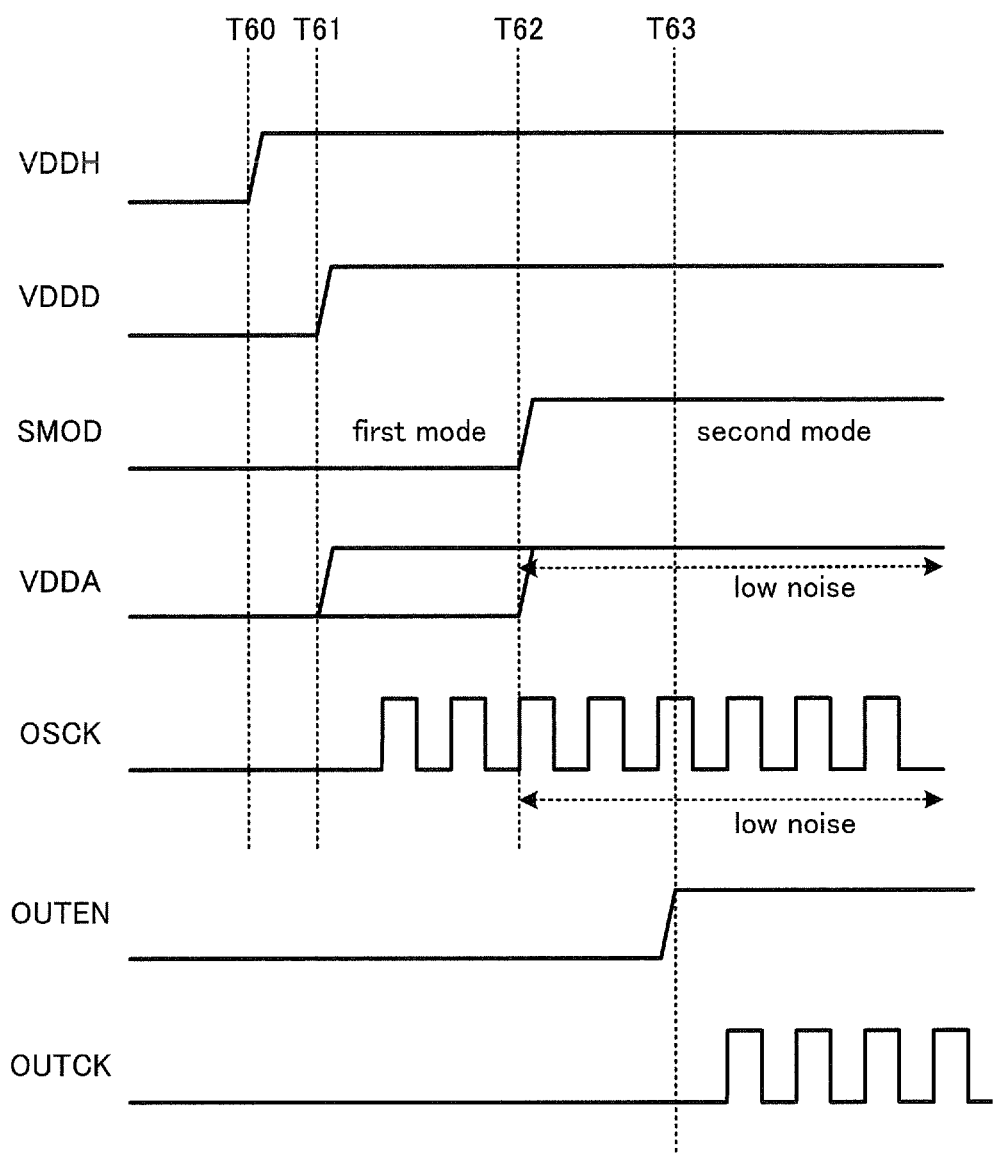
FIG. 3 is a signal waveform chart for explanation of an operation sequence of the first configuration example of the embodiment.

FIG. 3 is the signal waveform chart for explanation of the operation sequence of the first configuration example of the embodiment in FIG. 2. First, the operation of the circuit device 20 of the embodiment is started from when external supply of the power supply voltage VDDH is turned on at time T60. The power supply voltage VDDH is e.g. about 3.3 V. Then, at time T61, when a detection circuit (not shown) of the circuit device 20 detects that the power supply voltage VDDH is equal to or higher than a predetermined voltage, activation of the digital power supply circuit 30 and the analog power supply circuit 40 is triggered. Thereby, the digital power supply circuit 30 is activated fast and supplies e.g. the digital power supply voltage VDDD=1.8 V to the digital circuit 50. Concurrently, the timing control circuit 52 outputs the mode setting signal SMOD at the L level to the analog power supply circuit 40, and thereby, the analog power supply circuit 40 is set in the first mode and activated fast. The first mode is the fast activation mode, and thus, the power supply noise is larger. Note that, as described above, actually, the timing control circuit 52 is contained in the digital circuit 50.

When the analog power supply circuit 40 is activated at time T61 and the analog power supply voltage VDDA is supplied to the oscillation circuit 62 as the analog circuit 60, the oscillation operation of the oscillation circuit 62 is started and the oscillation signal OSCK having a predetermined oscillation frequency is generated. In this case, the noise of the oscillation signal OSCK remains large. Here, the difference of the time T61–T60 is equal to or less than about 100 μsec.

At time T62, the timing control circuit 52 waits for a predicted time when the oscillation operation becomes stable and changes the mode setting signal SMOD from the L level to the H level. The L level is e.g. 0 V and the H level is e.g. 1.8 V. Thereby, the analog power supply circuit 40 is smoothly switched from the first mode to the second mode as the low noise mode with the analog power supply voltage VDDA=1.8 V maintained. Then, the oscillation signal OSCK generated by the oscillation circuit 62 is also switched to that having low-noise signal characteristics. Here, the difference of the time T62–T61 is equal to or less than about 1 msec.

At time T63, the timing control circuit 52 waits for a predicted time when the oscillation signal OSCK changes to that having low-noise signal characteristics, and changes the output enable signal OUTEN from the L level to the H level. Thereby, the output circuit 80 outputs the clock signal OUTCK based on the oscillation signal OSCK to outside. As a result, the low-noise clock signal OUTCK is output to outside via the output terminal of the circuit device 20. Here, the difference of the time T63–T62 is equal to or less than about 10 μsec.

As described above, according to the embodiment in FIG. 3, the time after the supply of the power supply voltage VDDH is turned on and before the low-noise clock signal OUTCK is output from the circuit device 20 is equal to or less than about 1.11 msec.

In the embodiment, the analog power supply circuit 40 supplies the analog power supply voltage VDDA to the analog circuit 60 in the first mode during the times T61 to T62 in FIG. 3. Specifically, the circuit supplies the analog power supply voltage VDDA to the oscillation circuit 62 as the analog circuit 60. Then, after time T62, the analog power supply circuit 40 supplies the analog power supply voltage VDDA to the analog circuit 60 in the second mode. That is, at time T62, the timing control circuit 52 changes the mode setting signal SMOD from the L level as a first voltage level to the H level as a second voltage level, and the operation mode of the analog power supply circuit 40 is switched from the first mode to the second mode. Thereby, in the second mode as the low noise mode, the analog power supply voltage VDDA is supplied to the oscillation circuit 62 as the analog circuit 60. In the above described manner, the analog power supply circuit 40 is set in the first mode and the supply of the analog power supply voltage VDDA is started in a short time, then, the analog power supply circuit 40 is set in the second mode, and thereby, the low-noise analog power supply voltage VDDA may be supplied to the analog circuit 60.

Further, in the embodiment, the operation mode of the analog power supply circuit 40 is switched from the first mode to the second mode after the digital power supply circuit 30 supplies the digital power supply voltage VDDD to the digital circuit 50 at time T61 in FIG. 3. That is, the digital power supply voltage VDDD is supplied to the digital circuit 50 at time T61, and thereby, the digital circuit 50 may execute various kinds of control processing including the control processing for the analog circuit 60. Then, the operation mode of the analog power supply circuit 40 is switched from the first mode to the second mode at time T62, and the supply of the low-noise analog power supply voltage VDDA to the analog circuit 60 by the analog power supply circuit 40 is started. Thereby, the low-noise analog power supply voltage VDDA is supplied to the analog circuit 60 while the digital circuit 50 and the analog circuit 60 are activated in an appropriate sequence, and proper operation of the analog circuit 60 with low noise power supply may be realized.

In the embodiment, the analog circuit 60 includes the oscillation circuit 62 that generates the oscillation signal OSCK by oscillation. The analog power supply circuit supplies the analog power supply voltage VDDA to the oscillation circuit 62 in the first mode at time T61 after rise of the power supply voltage VDDH at time T60 in FIG. 3. Then, at time T62, the analog power supply circuit 40 supplies the analog power supply voltage VDDA to the oscillation circuit 62 in the second mode. Thereby, after the rise of the power supply voltage VDDH, the analog power supply circuit 40 is activated in a fast activation time, the low-noise analog power supply voltage VDDA is supplied to the oscillation circuit 62, and proper oscillation operation of the oscillation circuit 62 with the low noise power supply may be realized.

In the embodiment, the circuit device 20 includes the timing control circuit 52 that sets the operation mode of the analog power supply circuit 40 to the first mode or the second mode. For example, as shown at time T62 in FIG. 3, the timing control circuit 52 changes the mode setting signal SMOD from the L level to the H level, and thereby, the operation mode of the analog power supply circuit 40 is switched from the first mode to the second mode. On the other hand, when the timing control circuit 52 changes the mode setting signal SMOD from the H level to the L level, the operation mode of the analog power supply circuit 40 is switched from the second mode to the first mode. In this manner, under the control of the timing control circuit 52, the operation mode of the analog power supply circuit 40 may be set to the first mode to enable fast activation, and the operation mode of the analog power supply circuit 40 may be set to the second mode to enable low-noise power supply. The timing control circuit 52 operates based on the digital power supply voltage VDDD from the digital power supply circuit 30, and thus, after rise of the digital power supply voltage VDDD, the timing control circuit 52 operates and the timing control circuit 52 can switch the operation mode of the analog power supply circuit 40 from the first mode of fast activation to the second mode of low-noise power supply.

In the circuit device 20 of the embodiment, the analog circuit 60 includes the output circuit 80 that outputs the output signal when the analog power supply voltage VDDA is supplied thereto from the analog power supply circuit 40. As shown in FIGS. 2 and 3, the output circuit 80 outputs the clock signal OUTCK as the output signal. The output circuit 80 outputs the clock signal OUTCK as the output signal after the analog power supply circuit 40 is switched from the first mode to the second mode. For example, the output circuit 80 is output-enabled and outputs the clock signal OUTCK after the analog power supply circuit 40 is switched from the first mode to the second mode. Specifically, at time T62 in FIG. 3, the timing control circuit 52 changes the mode setting signal SMOD from the L level to the H level, and thereby, the operation mode of the analog power supply circuit 40 is switched from the first mode to the second mode. After the operation mode is switched from the first mode to the second mode, at time T63, the timing control circuit 52 changes the output enable signal OUTEN from the L level to the H level. Thereby, the output circuit 80 is output-enabled and outputs the clock signal OUTCK. In this manner, the analog power supply circuit 40 is switched from the first mode to the second mode and supplies the low-noise analog power supply voltage VDDA, the output circuit 80 is enabled to output the low-noise clock signal OUTCK thereby, and then, the output circuit 80 may be output-enabled. Then, the low-noise clock signal OUTCK may be output to outside by the output circuit 80.

Figure 4:
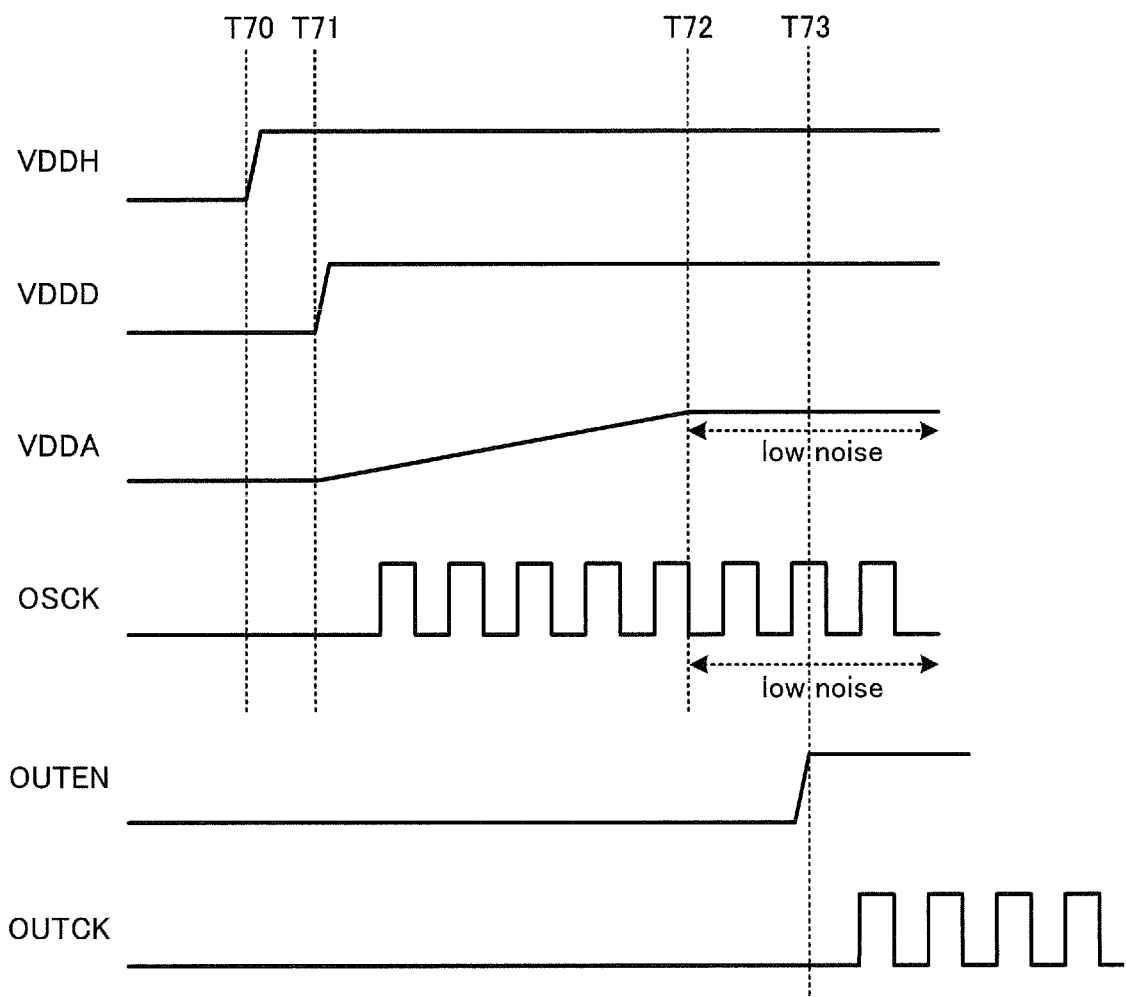
FIG. 4 is a signal waveform chart for explanation of an operation sequence of a comparative example.

FIG. 4 is the signal waveform chart for explanation of the operation sequence of the comparative example without the first and second modes in the analog power supply circuit 40. First, at time T70, the operation of the circuit device 20 is started from when external supply of the power supply voltage VDDH is turned on. Then, at time T71, the power supply voltage VDDH equal to or higher than a predetermined voltage is detected, and activation of the digital power supply circuit 30 and the analog power supply circuit 40 is triggered. Thereby, the digital power supply circuit 30 is activated fast. On the other hand, in the comparative example, the analog power supply circuit 40 does not have the first and second modes, and is a dedicated power supply circuit for low-noise power supply, and thus, the activation time is longer than that in FIG. 3. When the analog power supply voltage VDDA is supplied to the oscillation circuit 62, the oscillation circuit 62 starts the oscillation operation and generates the oscillation signal OSCK, however, activation of the analog power supply circuit 40 is slow and the generation of the oscillation signal OSCK is also slow. Here, the difference of time T71−T70 is equal to or less than about 100 μsec.

Time T72 is a predicted time to wait for the activation time of the analog power supply circuit 40. The analog power supply circuit 40 is in the low noise mode from the start, however, the value of the output analog power supply voltage VDDA is not normal and, even when clock pulse is output as the oscillation signal OSCK, this is not available. To make the noise of the power supply of the analog power supply circuit 40 lower, it is necessary to increase the time constant of the lowpass filter, which will be described later, however, when the time constant is made larger, the activation time becomes very long. For example, when the cutoff frequency of the lowpass filter is set to 10 kHz, the activation time becomes about 5 msec. As described above, the difference of the time T72−T71 is equal to or more than about 5 msec.

At time T73, the timing control circuit 52 waits for the predicted activation time of the analog power supply circuit 40 and changes the output enable signal OUTEN from the L level to the H level. Thereby, the output circuit 80 outputs the low-noise clock signal OUTCK based on the oscillation signal OSCK to outside. Here, the difference of the time T73−T72 is equal to or less than about 10 μsec.

As described above, in the comparative example in FIG. 4, the time after the supply of the power supply voltage VDDH is turned on and before the low-noise clock signal OUTCK is output from the circuit device 20 is equal to or more than about 5 msec. On the other hand, in the embodiment in FIG. 3, the time until the clock signal OUTCK is output is equal to or less than about 1.11 msec as described above, and the low-noise clock signal OUTCK can be output in a faster activation time.

Figure 5:
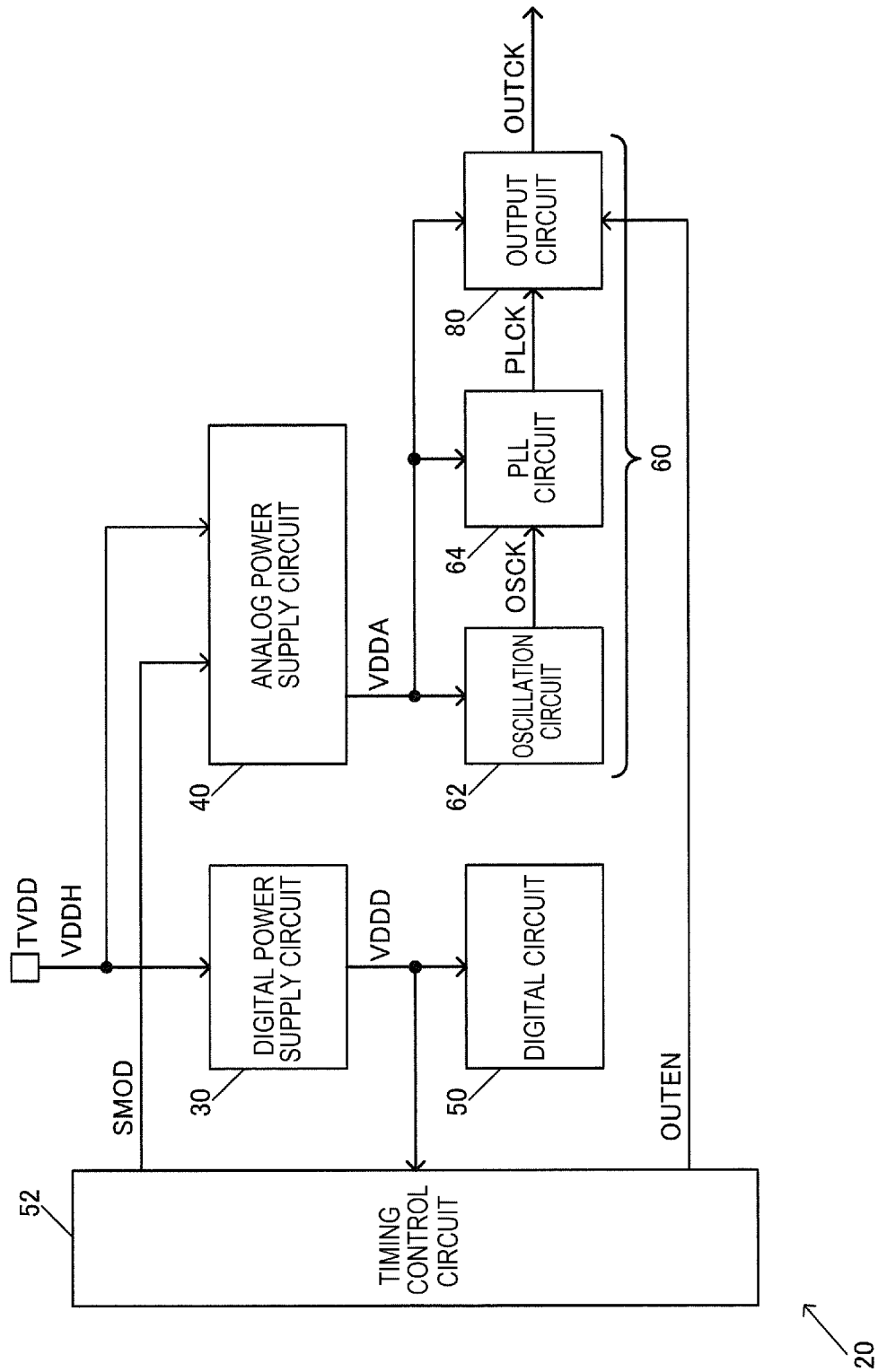
FIG. 5 shows a detailed second configuration example of the circuit device of the embodiment.

FIG. 5 shows the detailed second configuration example of the circuit device 20 of the embodiment. In FIG. 5, the oscillation circuit 62, a PLL circuit 64, and the output circuit 80 are provided as the analog circuit 60. The PLL circuit 64 generates a clock signal PLCK formed by multiplication of the oscillation signal OSCK from the oscillation circuit 62. The output circuit 80 outputs the clock signal OUTCK in various signal formats including LVDS, PECL, HCSL, or differential CMOS based on the clock signal PLCK from the PLL circuit 64.

As described above, in FIG. 5, the analog circuit 60 includes the PLL circuit 64 that generates the clock signal PLCK. The clock signal PLCK is the clock signal at a frequency formed by multiplication of the oscillation frequency of the oscillation signal OSCK. For example, as will be described later in FIG. 13, the PLL circuit 64 generates the clock signal PLCK in phase synchronization with the oscillation signal OSCK at the frequency formed by multiplication of the oscillation frequency.

Then, the analog power supply circuit 40 supplies the analog power supply voltage VDDA to the PLL circuit 64 in the first mode, and then, supplies the analog power supply voltage VDDA to the PLL circuit 64 in the second mode. For example, after rise of the power supply voltage VDDH, the analog power supply circuit 40 is activated fast in the first mode and starts supply of the analog power supply voltage VDDA to the PLL circuit 64. Note that, concurrently, the analog power supply circuit 40 also starts supply of the analog power supply voltage VDDA to the oscillation circuit 62. In this case, power supply circuits such as regulator circuits respectively corresponding the oscillation circuit 62 and the PLL circuit 64 may be separately provided to supply the analog power supply voltage VDDA.

For example, the analog power supply circuit 40 is activated fast in the first mode and starts supply of the analog power supply voltage VDDA to the PLL circuit 64. For example, the first mode is set, compared to the second mode, the supply of the analog power supply voltage VDDA is started faster though the noise level is larger. The first mode of fast activation is used, and thereby, PLL operation of the PLL circuit 64 may be activated fast. For example, after the power supply voltage VDDH is turned on and rises, the PLL circuit 64 performs the PLL operation in a short time. Then, the operation mode is switched from the first mode to the second mode, the analog power supply circuit 40 supplies the analog power supply voltage VDDA with lower noise than that in the first mode is to the PLL circuit 64. Thereby, the low-noise clock signal PLCK is output from the PLL circuit 64, and the clock signal OUTCK output by the output circuit 80 based on the clock signal PLCK is also the low-noise signal.

Figure 6:
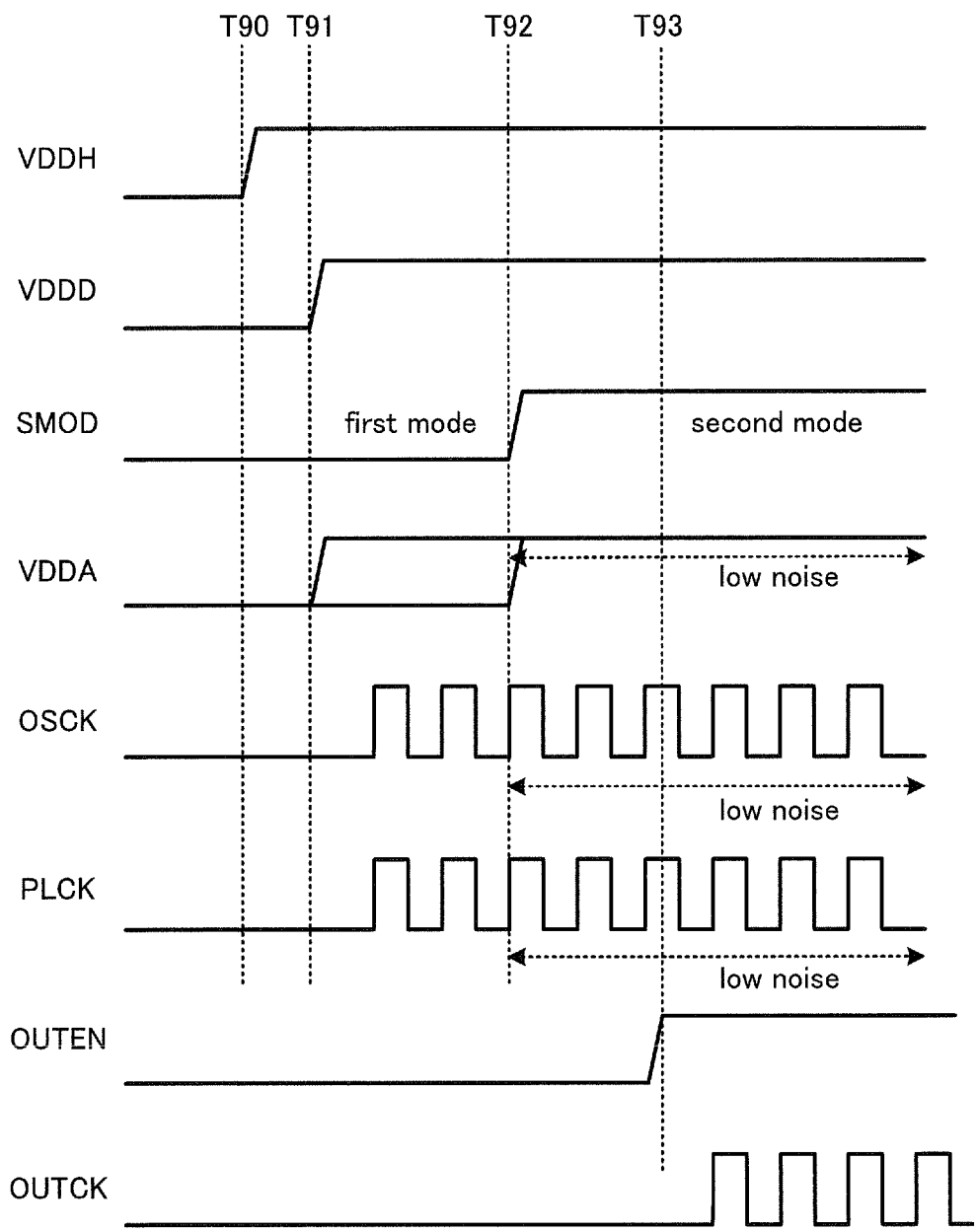
FIG. 6 is a signal waveform chart for explanation of an operation sequence of the second configuration example of the embodiment.

FIG. 6 is the signal waveform chart for explanation of the operation sequence of the second configuration example of the embodiment in FIG. 5. First, operation of the circuit device 20 is started from when supply of the power supply voltage VDDH is turned on at time T90. At time T91, the power supply voltage VDDH equal to or higher than a predetermined voltage is detected, and activation of the digital power supply circuit 30 and the analog power supply circuit 40 is triggered. Thereby, the digital power supply circuit 30 is activated fast, and supplies the digital power supply voltage VDDD to the digital circuit 50. Concurrently, the timing control circuit 52 outputs the mode setting signal SMOD at the L level to the analog power supply circuit 40, and thereby, the analog power supply circuit 40 is set in the first mode and activated fast.

When the analog power supply circuit 40 is activated at time T91 and the analog power supply voltage VDDA is supplied to the oscillation circuit 62, the oscillation operation of the oscillation circuit 62 is started and the oscillation signal OSCK having a predetermined oscillation frequency is generated. In this case, the noise of the oscillation signal OSCK remains large. Concurrently, the analog power supply voltage VDDA is supplied to the PLL circuit 64, and thereby, the PLL circuit 64 is activated and starts the PLL operation using the oscillation signal OSCK as a reference clock signal. Immediately after the activation, the clock output of the PLL circuit 64 is unstable. Here, the difference of the time T91–T90 is equal to or less than about 100 μsec.

At time T92, the timing control circuit 52 waits for a predicted time when the oscillation operation becomes stable and when the PLL operation becomes stable, and changes the mode setting signal SMOD from the L level to the H level. Thereby, the analog power supply circuit 40 is smoothly switched to the second mode as the low noise mode with the analog power supply voltage VDDA=1.8 V maintained. Thereby, the oscillation signal OSCK generated by the oscillation circuit 62 is also switched to low-noise signal characteristics, and then, the clock signal PLCK generated by the PLL circuit 64 is also switched to low-noise signal characteristics. Here, the difference of the time T92–T91 is equal to or less than about 1 msec.

At time T93, the timing control circuit 52 waits for a predicted time when the clock signal PLCK changes to that having low-noise signal characteristics, and changes the output enable signal OUTEN from the L level to the H level. Thereby, the output circuit 80 outputs the clock signal OUTCK based on the clock signal PLCK from the PLL circuit 64 to outside. As a result, the low-noise clock signal OUTCK is output to outside via the output terminal of the circuit device 20. Here, the difference of the time T93–T92 is equal to or less than about 10 μsec.

As described above, according to the embodiment in FIG. 4, the time after the supply of the power supply voltage VDDH is turned on and before the low-noise clock signal OUTCK is output from the circuit device 20 is equal to or less than about 1.11 msec.

In the embodiment, in a frequency change period of the PLL circuit 64, the analog power supply circuit 40 is switched from the second mode to the first mode. Then, after the end of the frequency change period, the analog power supply circuit 40 is switched from the first mode to the second mode. The frequency change period is a period in which the PLL circuit 64 changes the locked clock frequency and, for example, a processing circuit 90 changes the frequency code in FIG. 13, which will be described later, and thereby, the clock frequency is changed.

Figure 7:
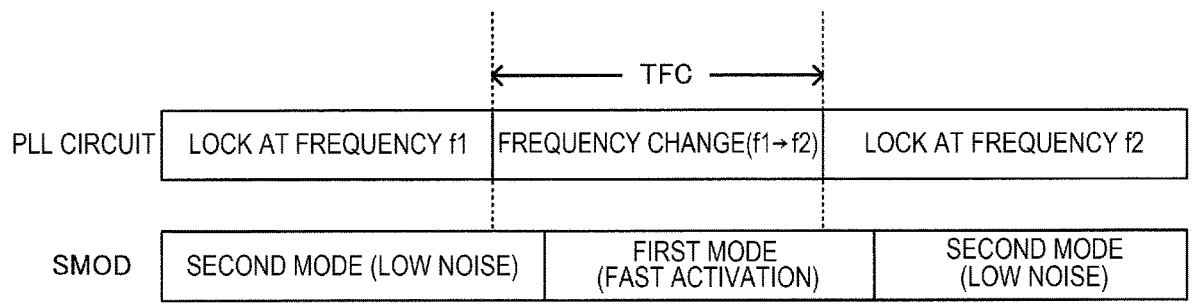
FIG. 7 is an explanatory diagram of mode switching in a frequency change period of a PLL circuit.

Specifically, in FIG. 7, the clock frequency of the clock signal PLCK of the PLL circuit 64 is locked at a frequency f1. In the state, when the clock frequency is changed from f1 to f2 using a frequency code, the clock frequency of the PLL circuit 64 is locked at a frequency f2. Then, as shown in FIG. 7, in a state in which the clock frequency of the PLL circuit 64 is locked at f1, the analog power supply circuit 40 is set in the second mode and the low-noise analog power supply voltage VDDA is supplied to the PLL circuit 64. Thereby, the PLL circuit 64 may generate the low-noise clock signal PLCK. Then, in a frequency change period TFC, the analog power supply circuit 40 is switched from the second mode as the low noise mode to the first mode as the fast activation mode. Then, after the frequency is changed from the frequency f1 to the frequency f2 in the frequency change period TFC, the analog power supply circuit 40 is switched from the first mode as the fast activation mode to the second mode as the low noise mode. Thereby, the low-noise analog power supply voltage VDDA is supplied to the PLL circuit 64, and the circuit may output the low-noise clock signal PLCK locked at the frequency f2.

Specifically, in the frequency change period TFC, for example, the operation of the PLL circuit 64 is stopped and, after the operation is stopped, the processing circuit 90 in FIG. 13 changes the frequency code and changes a division ratio of a frequency divider circuit 70. Then, when the PLL circuit 64 is reactivated, the operation mode of the analog power supply circuit 40 is switched from the second mode to the first mode as the fast activation mode. Thereby, the analog power supply voltage VDDA having stable voltage fluctuation for sharp load current fluctuation in the PLL circuit 64 may be supplied to the PLL circuit 64, and the PLL circuit 64 can be reactivated fast. Then, the clock frequency of the PLL circuit 64 is locked at the frequency f2, the operation mode of the analog power supply circuit 40 is switched from the first mode to the second mode as the low noise mode. Thereby, the PLL circuit 64 may output the low-noise clock signal PLCK locked at the frequency f2. As described above, the operation mode of the analog power supply circuit 40 is switched as shown in FIG. 7, and thereby, the frequency of the PLL circuit 64 may be changed in a short time and the changed low-noise clock signal PLCK locked at the frequency f2 may be output from the PLL circuit 64.

3. Configuration of Power Supply Circuit

Figure 8:
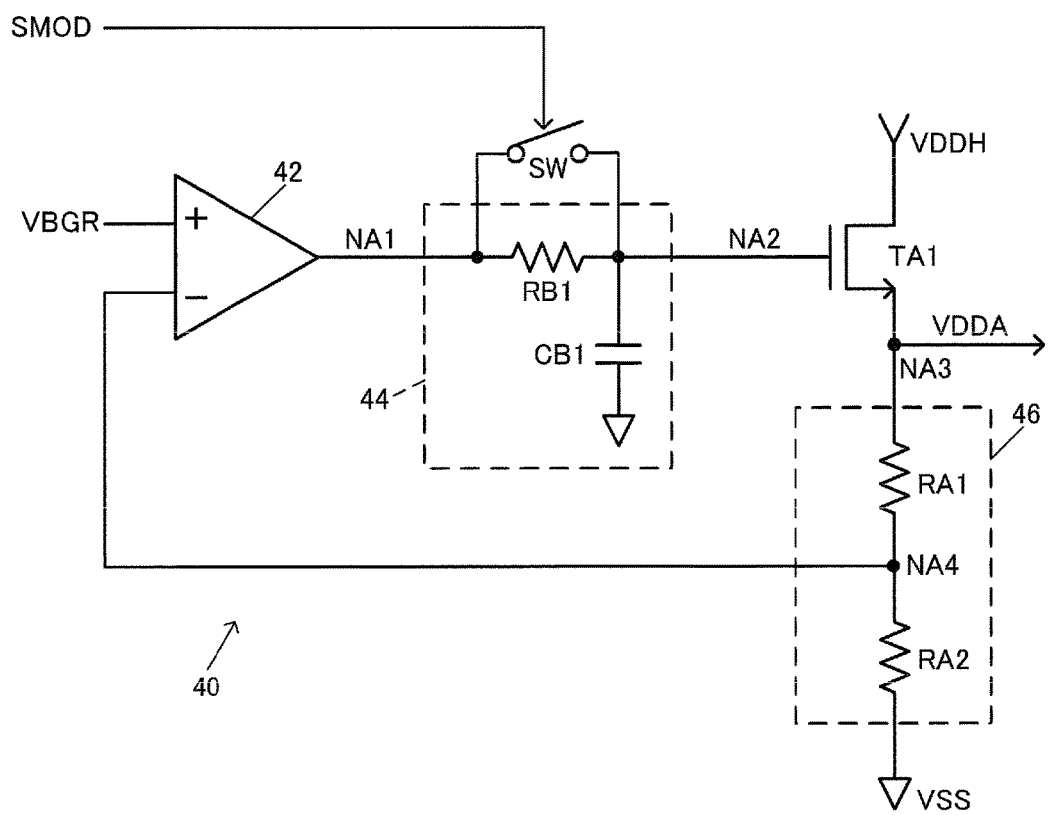
FIG. 8 shows a first configuration example of an analog power supply circuit.

Next, a detailed configuration example of the analog power supply circuit 40 as a power supply circuit will be explained. FIG. 8 shows the first configuration example of the analog power supply circuit 40 that generates the analog power supply voltage as the power supply voltage. In the embodiment, the analog power supply circuit 40 includes a lowpass filter 44 for noise reduction. The lowpass filter 44 is a passive filter including a passive element e.g. a resistance, capacitor, or the like. The first mode is a mode in which a signal does not pass through the lowpass filter 44. For example, the first mode is a mode in which a signal bypasses the lowpass filter 44. For example, in the first mode, the signal does not pass a signal path of the lowpass filter 44, but passes a bypass path via a switch SW. On the other hand, the second mode is a mode in which a signal passes through the lowpass filter 44. For example, in the second mode, the signal passes the signal path of the lowpass filter, and thereby, the signal is subjected to lowpass filtering. Then, the analog power supply circuit 40 generates the analog power supply voltage VDDA based on the signal. Here, the signal is an internal signal of the analog power supply circuit 40. Specifically, in FIG. 8, the analog power supply circuit 40 includes an amplifier circuit 42 for generation of the analog power supply voltage VDDA, and the signal is an output signal of the amplifier circuit 42.

For example, the second mode is a mode in which the lowpass filter 44 operates and the analog power supply voltage VDDA supplied from the analog power supply circuit 40 has lower noise than that in the first mode. On the other hand, the first mode is a mode in which the signal path of the lowpass filter 44 is bypassed, and thereby, the activation of the power supply by the analog power supply circuit 40 is faster than that in the second mode. For example, the first mode is a mode in which the analog power supply circuit 40 follows load current fluctuation in the analog circuit 60 and may stably supply the analog power supply voltage VDDA. As described above, the first mode in which the signal does not pass through the lowpass filter 44 is provided, and thereby, the analog power supply circuit 40 follows the load current fluctuation in the analog circuit 60 and fast activation of the power supply of the analog power supply circuit 40 can be performed. Further, the second mode in which the signal passes through the lowpass filter 44 is provided, and thereby, the lowpass filtered analog power supply voltage VDDA is output and low-noise power supply can be performed.

Specifically, as shown in FIG. 4, the analog power supply circuit 40 includes the amplifier circuit 42, a transistor TA1 for driving, the lowpass filter 44, the switch SW, and a voltage divider circuit 46.

The amplifier circuit 42 is an error amplifier and realized using e.g. an operational amplifier. Specifically, the amplifier circuit 42 has a first input terminal to which a reference voltage VBGR is input. In FIG. 8, the first input terminal is a non-inverting input terminal of the amplifier circuit 42. Further, the reference voltage VBGR is a constant voltage generated by a reference voltage generation circuit such as e.g. a bandgap reference circuit. For example, the reference voltage VBGR is about 1.2 V.

The transistor TA1 is e.g. an N-type transistor as a first conductivity type. The transistor TA1 is provided between a node of VDDH as a first power supply node and an output node NA3 of the analog power supply voltage VDDA. For example, the drain of the transistor TA1 is coupled to the node of VDDH, and the source is coupled to the output node NA3. The power supply voltage VDDH is e.g. 3.3 V and the analog power supply voltage VDDA is e.g. 1.8 V.

The lowpass filter 44 is provided between a node NA1 of the output terminal of the amplifier circuit 42 and a node NA2 of a gate of the transistor TA1. For example, the output signal of the amplifier circuit 42 is input to the gate of the transistor TA1 via the lowpass filter 44. In FIG. 8, the lowpass filter 44 is a primary RC filter including a resistance RB1 and a capacitor CB1. For example, the resistance RB1 has one end coupled to the node NA1 of the amplifier circuit 42 and the other end coupled to the node NA2 of the gate of the transistor TA1. The capacitor CB1 has one end coupled to the node NA2 and the other end coupled to a node of VSS as low-potential side power supply voltage. The resistance value of the resistance RB1 is e.g. about 20 MΩ and the capacitance value of the capacitor CB1 is e.g. about 100 pF. Note that the lowpass filter 44 is not limited to the configuration in FIG. 8, but may be a secondary or tertiary lowpass filter.

The switch SW is placed in parallel to the lowpass filter 44. That is, the switch SW is provided in parallel to the lowpass filter 44 between the node NA1 of the output terminal of the amplifier circuit 42 and the node NA2 of the gate of the transistor TA1. For example, the switch SW is provided in a signal path that bypasses the signal path of the lowpass filter 44. Specifically, one end of the switch SW is coupled to the node NA1 of the output terminal of the amplifier circuit 42 and the other end is coupled to the node NA2 of the gate of the transistor TA1. The switch SW is realized using e.g. a transistor or transfer gate.

The voltage divider circuit 46 is provided between the output node NA3 of the analog power supply voltage VDDA and the node of VSS as a second power supply node. The voltage formed by division of the analog power supply voltage VDDA is output to a second input terminal of the amplifier circuit 42. In FIG. 8, the second input terminal of the amplifier circuit is a non-inverting input terminal. Specifically, the voltage divider circuit 46 is a resistance divider circuit and includes resistances RA1 and RA2 provided in series between the output node NA3 of the analog power supply voltage VDDA and the node of VSS. Further, a node NA4 as a coupling node between the resistance RA1 and the resistance RA2 is coupled to the second input terminal of the amplifier circuit 42. The node NA4 is a voltage division node. Note that the coupling in the embodiment is electrical coupling. The electrical coupling refers to coupling that enables transmission of electrical signals. The electrical coupling is coupling that enables transmission of information by electrical signals and may be coupling via a signal line, active element, or the like.

The analog power supply circuit 40 in FIG. 8 operates as a regulator circuit. For example, when resistance values of the resistances RA1 and RA2 are R1 and R2, respectively, the analog power supply circuit 40 generates the analog power supply voltage VDDA as a constant voltage to satisfy VDDA {(R1+R2)/R2}×VBGR.

In the embodiment, the switch SW is on in the first mode and off in the second mode.

Specifically, when the mode setting signal SMOD from the timing control circuit 52 is at the L level corresponding to the logic level "0", the switch SW is turned on. Thereby, the output signal of the amplifier circuit 42 bypasses the lowpass filter 44, and is input to the gate of the transistor TA1 via the bypass path of the turned on switch SW. Thereby, the function of the lowpass filter 44 is turned off, and the analog power supply circuit 40 operates as a normal regulator circuit without the lowpass filter 44. That is, the analog power supply circuit 40 has the same circuit configuration as the digital power supply circuit 30 in FIG. 11, which will be described later, and operates as a power supply circuit that is activated fast for power supply and can supply the analog power supply voltage VDDA stable for load current fluctuation.

On the other hand, the mode setting signal SMOD from the timing control circuit 52 is in the H level corresponding to the logic level "1", the switch SW is turned off. Thereby, the output signal of the amplifier circuit 42 passes through the lowpass filter 44, and the lowpass-filtered output signal is input to the gate of the transistor TA1. Thereby, the function of the lowpass filter 44 is turned on, and the analog power supply circuit 40 may generate the low-noise analog power supply voltage VDDA. That is, the noise generated by the amplifier circuit 42 may be sufficiently attenuated by the lowpass filter 44, and thereby, the low-noise analog power supply voltage VDDA may be generated. As described above, according to the analog power supply circuit 40 having the configuration in FIG. 8, the switch SW is turned on and off, and thereby, the first mode as the fast activation mode and the second mode as the low noise mode can be simply switched.

Figure 9:
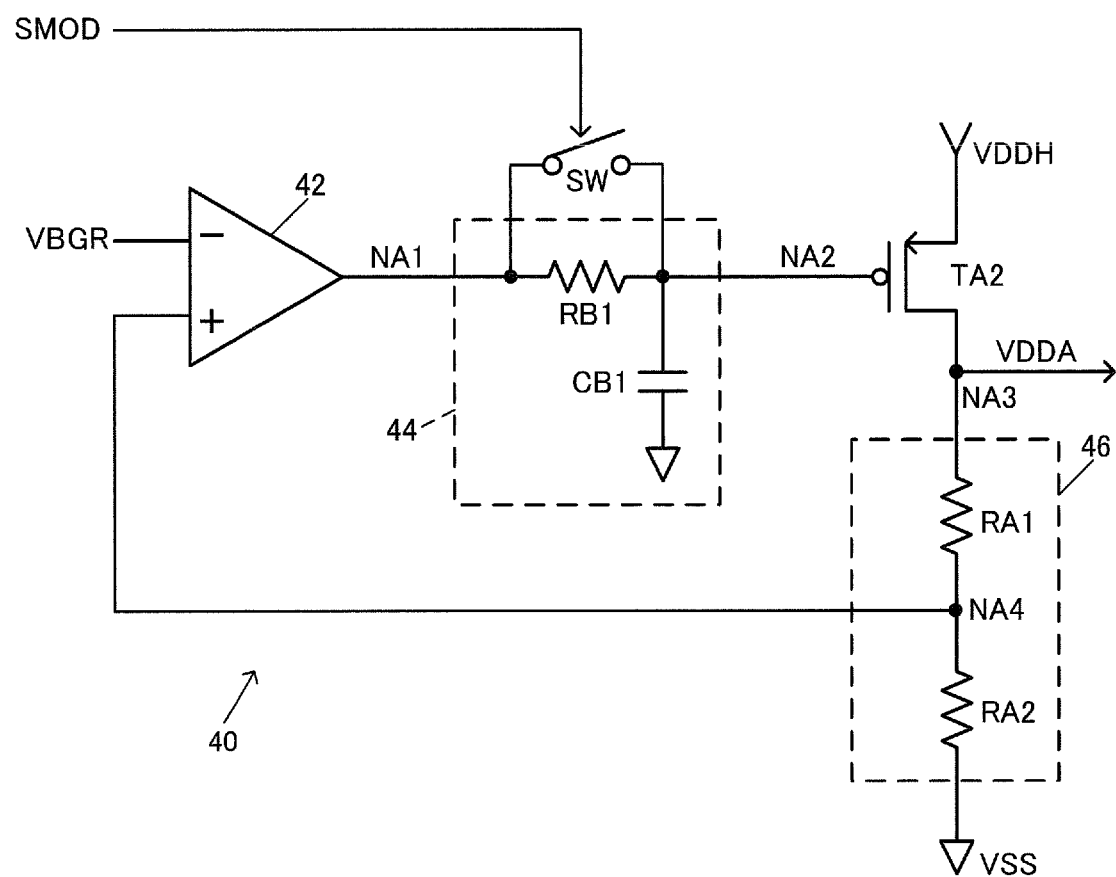
FIG. 9 shows a second configuration example of the analog power supply circuit.

FIG. 9 shows the second configuration example of the analog power supply circuit 40. The configuration in FIG. 9 is different from that in FIG. 8 in that the transistor for driving is a P-type transistor TA2 in FIG. 9 while the transistor is the N-type transistor TA1 in FIG. 8. Here, the N-type is the first conductivity type and the P-type is the second conductivity type. Further, in FIG. 8, the first input terminal of the amplifier circuit 42 to which the reference voltage VBGR is input is the non-inverting input terminal and the second input terminal of the amplifier circuit 42 to which the node NA4 is coupled is an inverting input terminal. On the other hand, in FIG. 9, the first input terminal of the amplifier circuit 42 to which the reference voltage VBGR is input is an inverting input terminal and the second input terminal of the amplifier circuit 42 to which the node NA4 is coupled is a non-inverting input terminal.

As shown in FIG. 9, the transistor for driving is the P-type transistor TA2, and thereby, the analog power supply circuit 40 can be activated faster. On the other hand, the transistor for driving is the P-type transistor TA2, and thereby, there is a disadvantage that noise of the power supply voltage VDDH is easily transmitted to the analog power supply voltage VDDA. In this regard, the configuration in FIG. 8 is advantageous.

Figure 10:
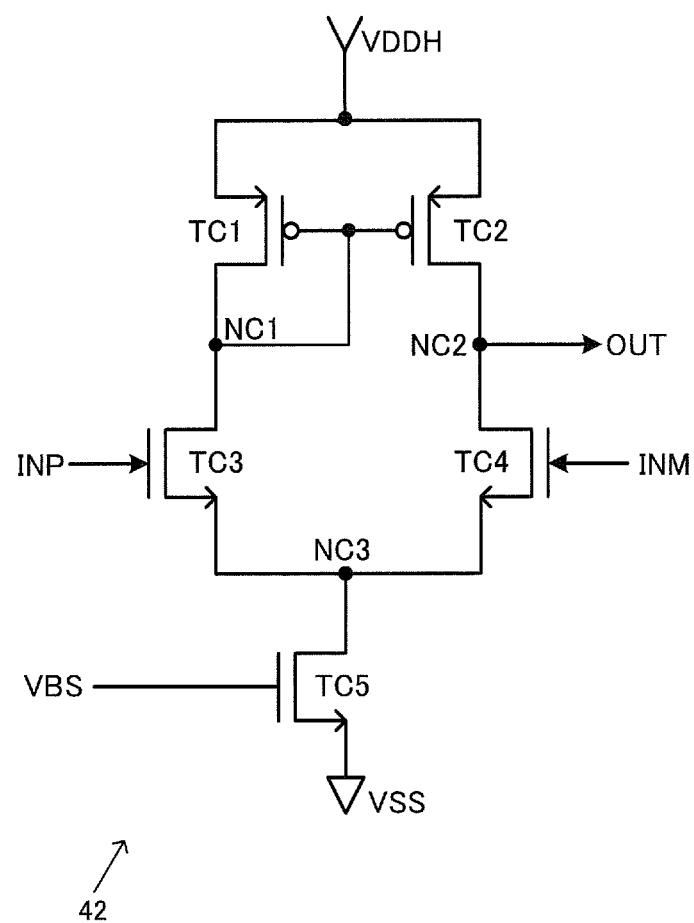
FIG. 10 shows a configuration example of an amplifier circuit.

FIG. 10 shows the configuration example of the amplifier circuit 42. The amplifier circuit 42 in FIG. 10 includes P-type transistors TC1, TC2 forming a current mirror circuit, N-type transistors TC3, TC4 as differential pair transistors, an N-type transistor TC5 as a bias current source. The transistors TC1, TC2 are provided between a node of VDDH and nodes NC1, NC2, and the node NC1 is coupled to the gates. The transistors TC3, TC4 are provided between the nodes NC1, NC2 and a node NC3, and the gate of the transistor TC3 is e.g. a non-inverting input terminal and the gate of the transistor TC4 is e.g. an inverting input terminal. The transistor TC5 is provided between the node NC3 and the node of VSS and a bias voltage VBS is input to the gate. Note that the configuration of the amplifier circuit 42 as the error amplifier is not limited to the configuration in FIG. 10, but various kinds of modifications can be made.

Figure 11:
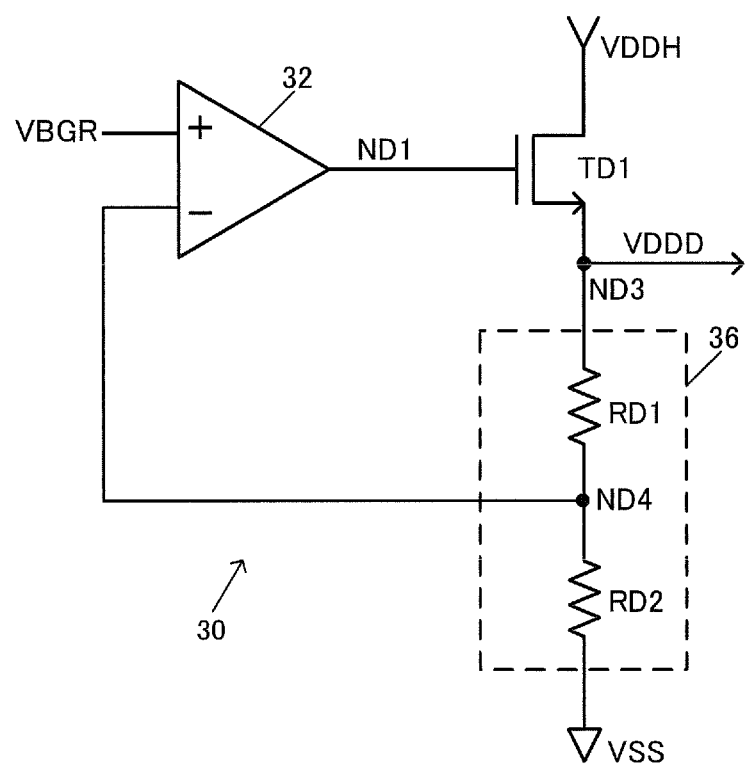
FIG. 11 shows a configuration example of a digital power supply circuit.

FIG. 11 shows the configuration example of the digital power supply circuit 30. The digital power supply circuit 30 has a configuration formed by omission of the lowpass filter 44 and the switch SW from the configuration of the analog power supply circuit 40 in FIG. 8. Specifically, the digital power supply circuit 30 includes an amplifier circuit 32 having a non-inverting input terminal as a first input terminal to which the reference voltage VBGR is input, and a transistor TD1 provided between a node of VDDH as a first power supply node and an output node ND3 of the digital power supply voltage VDDD. The transistor TD1 is e.g. an N-type transistor. Further, the digital power supply circuit 30 includes a voltage divider circuit 36 provided between the output node ND3 of the digital power supply voltage VDDD and a node of VSS as a second power supply node, and outputs a voltage formed by division of the digital power supply voltage VDDD to a non-inverting input terminal as a second input terminal of the amplifier circuit 32. According to the digital power supply circuit 30 having the above described configuration, at rise of the power supply voltage VDDH, the circuit may be activated fast to supply the digital power supply voltage VDDD to the digital circuit 50.

Note that, in FIG. 11, the transistor TD1 is the N-type transistor, however, like that in FIG. 9, the transistor TD1 may be a P-type transistor. In this case, the first input terminal of the amplifier circuit 32 to which the reference voltage VBGR is input is an inverting input terminal and the second input terminal of the amplifier circuit 32 to which the node ND4 is coupled is a non-inverting input terminal.

Figure 12:
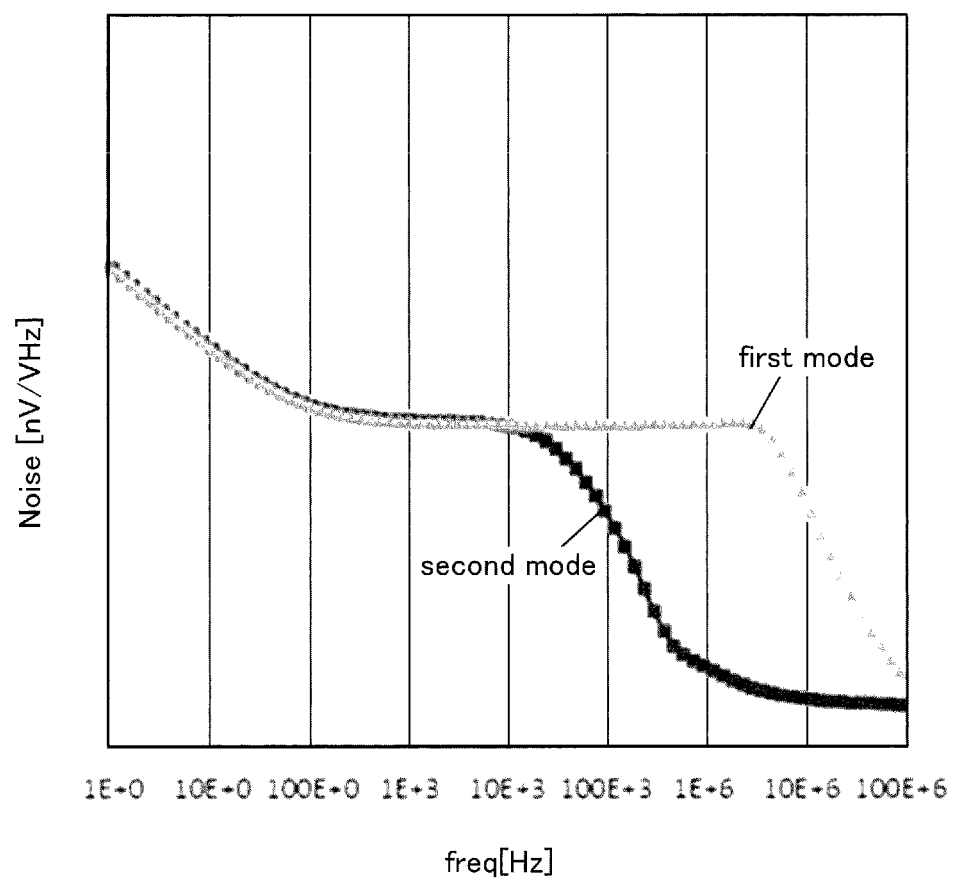
FIG. 12 shows an example of output noise characteristics of the analog power supply circuit.

FIG. 12 shows the example of output noise characteristics of the analog power supply circuit 40. When the mode setting signal SMOD is set at the H level, the analog power supply circuit 40 is set in the second mode, and the function of the lowpass filter 44 is turned on, lower noise than that in the first mode is realized in e.g. a band from 10 kHz to 10 MHz. The analog circuit 60 is operated by the low-noise analog power supply voltage VDDA from the analog power supply circuit 40, and thereby, noise of the analog circuit 60 itself may be reduced in the band from 10 kHz to 10 MHz, circuit characteristics of the analog circuit 60 may be improved, and, for example, lower noise of the output signal of the analog circuit 60 or the like may be realized. For example, when a clock signal is generated by the analog circuit 60, phase noise of the clock signal or the like may be reduced.

4. Oscillator

FIG. 13 shows the configuration example of the oscillator 4 of the embodiment. The oscillator 4 includes the circuit device 20 and the vibrator 10 of the embodiment. The vibrator 10 is electrically coupled to the circuit device 20. For example, the vibrator 10 and the circuit device 20 are electrically coupled using an interconnection, bonding wire, metal bump, or the like of a package housing the vibrator 10 and the circuit device 20.

The vibrator 10 is an element that generates mechanical vibration by an electrical signal. The vibrator 10 may be realized using e.g. a vibrator element such as a quartz crystal vibrator element. For example, the vibrator 10 may be realized using a quartz crystal vibrator element having a cut angle such as AT cut or SC cut and making thickness-shear vibration. For example, the vibrator 10 may be an SPXO (Simple Packaged Crystal Oscillator) vibrator. Or, the vibrator 10 may be a vibrator provided inside of an oven-controlled crystal oscillator (OCXO) with a constant-temperature oven or a vibrator provided inside of a temperature-compensated crystal oscillator (TCXO) without a constant-temperature oven. Note that the vibrator 10 of the embodiment may be realized using various vibrator elements including e.g. vibrator elements of other types than the thickness-shear vibration type and piezoelectric vibrator elements formed using other materials than quartz crystal. For example, as the vibrator 10, an SAW (surface Acoustic Wave) resonator, MEMS (Micro Electro Mechanical Systems) vibrator as a silicon-based vibrator formed using a silicon substrate, or the like may be employed.

The circuit device 20 includes the oscillation circuit 62, the PLL circuit 64, the output circuit 80, the processing circuit 90, and an interface circuit 92. The oscillation circuit 62 vibrates the vibrator 10 and generates a reference clock signal RFCK as an oscillation signal. For example, the circuit device 20 includes first and second terminals for vibrator, and one end of the vibrator 10 as an external component of the circuit device 20 is coupled to the first terminal for vibrator, and the other end of the vibrator is coupled to the second terminal for vibrator. The oscillation circuit 62 includes a buffer circuit for oscillation provided between the first terminal for vibrator and the second terminal for vibrator.

The reference clock signal RFCK from the oscillation circuit 62 is input to the PLL circuit 64, and the circuit generates a clock signal PLCK at a frequency formed by multiplication of the frequency of the reference clock signal RFCK. The PLL circuit 64 in FIG. 13 is an example of a fractional-N type PLL (Phase Locked Loop) circuit. Specifically, the PLL circuit 64 includes a comparator circuit 65, a charge pump circuit 66, a lowpass filter 67, an oscillation circuit 68, a buffer circuit 69, the frequency divider circuit 70, and a delta-sigma modulation circuit 71.

The comparator circuit 65 compares the reference clock signal RFCK and a clock signal DVCK. Specifically, the comparator circuit 65 compares phase and frequencies between the reference clock signal RFCK and the clock signal DVCK as a feedback signal from the oscillation circuit 68. The charge pump circuit 66 performs charge pump operation based on a comparison result of the comparator circuit 65. For example, the comparator circuit 65 performs phase comparison or the like between the reference clock signal RFCK and the clock signal DVCK, and outputs an up signal or a down signal as a comparison result as an output signal. The charge pump circuit 66 converts the output signal of the comparator circuit 65 into an output current. That is, the circuit converts the up signal or the down signal as a rectangular voltage pulse into the output current as a rectangular current pulse. The lowpass filter 67 smooths the output signal of the charge pump circuit 66 and generates and outputs a control voltage VC for controlling the oscillation frequency of the oscillation circuit 68 as VCO to the oscillation circuit 68. Specifically, the lowpass filter 67 current-voltage converts the output current of the charge pump circuit 66 and performs filtering thereon. The control voltage VC as an output voltage of the lowpass filter 67 rises when the up signal is output and falls when the down signal is output.

The control voltage VC from the lowpass filter 67 is input to the oscillation circuit 68, and thereby, capacitance of a varactor as a variable capacity element changes and the oscillation frequency of the oscillation circuit 68 is controlled. Then, a differential oscillation signal of the oscillation frequency set by the control voltage VC is output to the buffer circuit 69. The buffer circuit 69 outputs the clock signal PLCK to the output circuit 80 and outputs a clock signal FDCK for feedback to the frequency divider circuit 70 based on the differential oscillation signal. In the embodiment, the frequency divider circuit 70 and the delta-sigma modulation circuit 71 form a fractional frequency divider. The fractional frequency divider divides the clock signal FDCK for feedback using an inverse of the frequency multiplication ratio of the PLL circuit 64 as a division ratio, and outputs the frequency-divided clock signal DVCK to the comparator circuit 65. The delta-sigma modulation circuit 71 delta-sigma modulates the value of the decimal part of the division ratio and generates a modulation value as an integer. Then, the value of the integer part of the division ratio and an additional value of the modulation value are set as set values for the division ratio in the frequency divider circuit 70. Thereby, the fractional-N-type PLL circuit is realized.

The output circuit 80 outputs a clock signal in a signal waveform of LVDS, PECL, HCSL, or differential CMOS to outside of the circuit device 20. For example, the output circuit 80 may be a circuit that can output clock signals in all signal waveforms of LVDS, PECL, HCSL, and CMOS. In this case, the output circuit 80 outputs a clock signal in a signal waveform set by the processing circuit 90.

The processing circuit 90 performs various kinds of control processing and setting processing for the circuit device 20. For example, the processing circuit 90 performs control processing of the respective circuit blocks of the circuit device 20. Or, the processing circuit 90 may perform digital signal processing such as temperature compensation processing, aging correction processing, or digital filter processing. When the temperature compensation processing is performed, for example, a temperature sensor is provided, and the processing circuit 90 performs temperature compensation processing of compensating temperature characteristics of the oscillation frequency based on temperature detection information from the temperature sensor and outputs frequency control data for controlling the oscillation frequency. The processing circuit 90 may be realized using an ASIC (Application Specific Integrated Circuit) circuit by automatic placement and routing such as a gate array. Or, the processing circuit 90 may be realized using a processor such as a DSP (Digital Signal Processor) or CPU (Central Processing Unit).

The interface circuit 92 is a circuit that realizes an interface such as an I2C (Inter Integrated Circuit) or SPI (Serial Peripheral Interface). That is, the interface circuit 92 performs interfacing between an external device of the oscillator 4 and itself.

5. Electronic Apparatus, Vehicle

Figure 14:
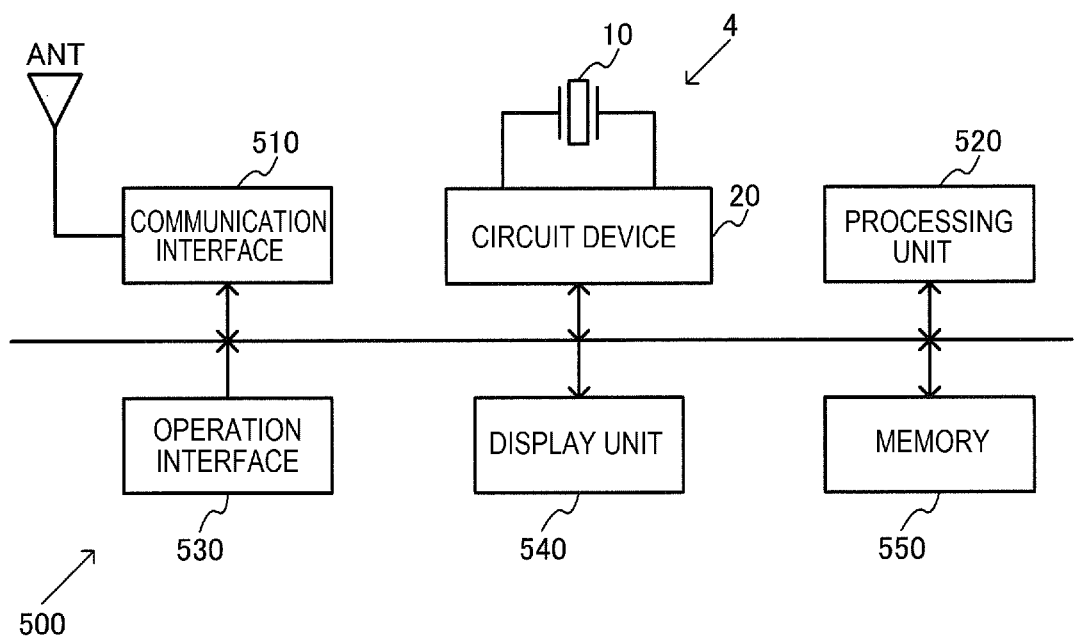
FIG. 14 shows a configuration example of an electronic apparatus.

FIG. 14 shows the configuration example of an electronic apparatus 500 including the circuit device 20 of the embodiment. The electronic apparatus 500 includes the vibrator 10, the circuit device 20, and a processing unit 520. Further, the electronic apparatus 500 may include an antenna ANT, a communication interface 510, an operation interface 530, a display unit 540, and a memory 550. The vibrator 10 and the circuit device 20 form the oscillator 4. Note that the electronic apparatus 500 is not limited to the configuration in FIG. 14, but various modifications can be made by omitting parts of the component elements or adding other component elements.

The electronic apparatus 500 includes e.g. a network-related apparatus such as a base station or router, a high-precision measuring apparatus that measures a physical quantity such as a distance, time, flow velocity, or flow rate, a biological information measuring apparatus that measures biological information, or an onboard apparatus. The biological information measuring apparatus includes e.g. an ultrasonic measuring apparatus, sphygmograph, or blood pressure measuring apparatus. The onboard apparatus includes an apparatus for automated driving or the like. Further, the electronic apparatus 500 may include a wearable apparatus such as a head mounted display apparatus or timepiece-related apparatus, a robot, a printing apparatus, a projection apparatus, a personal digital assistance such as a smartphone, a content providing apparatus that delivers contents, or an imaging apparatus such as a digital camera or video camera.

The communication interface 510 performs processing of receiving data from outside via the antenna ANT and transmitting data to outside. The processing unit 520 as a processor performs control processing of the electronic apparatus 500 and various kinds of digital processing of data transmitted and received via the communication interface 510. The function of the processing unit 520 may be realized using e.g. a processor such as a microcomputer. The operation interface 530 is for input operation by a user and may be realized by operation buttons, touch panel display, or the like. The display unit 540 displays various kinds of information and may be realized using a liquid crystal or organic EL display. The memory 550 stores data and the function thereof may be realized using a semiconductor memory such as a RAM or ROM.

Figure 15:
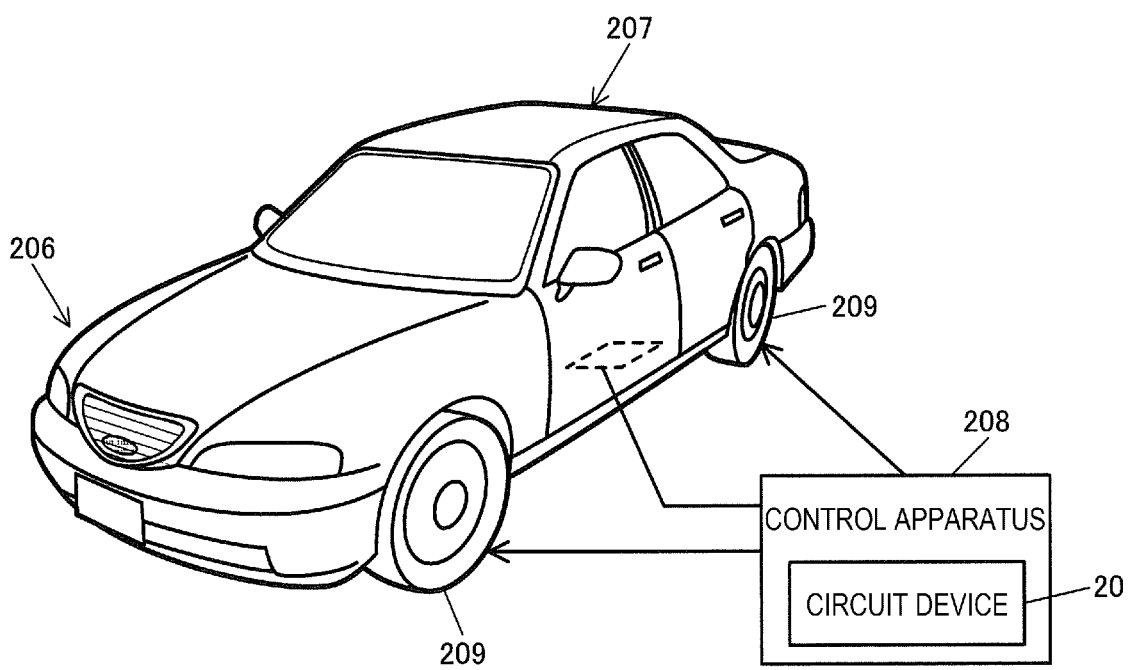
FIG. 15 shows a configuration example of a vehicle.

FIG. 15 shows an example of a vehicle containing the circuit device 20 of the embodiment. For example, the circuit device 20 of the embodiment may be incorporated into various vehicles such as automobiles, airplanes, motorcycles, bicycles, or ships. The vehicle is an apparatus that moves on the ground, in the sky, or at sea including e.g. a driving mechanism such as an engine or motor, a steering mechanism such as a handle or steering, and various kinds of electronic apparatuses. FIG. 15 schematically shows an automobile 206 as a specific example of the vehicle. In the automobile 206, an oscillator (not shown) having the circuit device 20 of the embodiment is incorporated. A control apparatus 208 operates by a clock signal generated by the oscillator. For example, the control apparatus 208 controls suspension hardness according to an attitude of a vehicle body 207 and controls braking of individual wheels 209. For example, automatic driving of the automobile 206 may be realized by the control apparatus 208. Note that the apparatus in which the circuit device 20 of the embodiment is incorporated is not limited to the control apparatus 208, but can be incorporated in various onboard apparatuses such as a meter panel apparatus or navigation apparatus provided in a vehicle including the automobile 206.

As described above, the circuit device of the embodiment includes the digital circuit, the digital power supply circuit that supplies the digital power supply voltage to the digital circuit, the analog circuit, and the analog power supply circuit that supplies the analog power supply voltage to the analog circuit. The analog power supply circuit has the first mode and the second mode as the operation modes, and the first mode is the mode in which activation of power supply is faster than that in the second mode and the second mode is the mode in which power supply is performed with lower noise than that in the first mode.

According to the embodiment, the digital circuit operates by the digital power supply voltage supplied from the digital power supply circuit, and the analog circuit operates by the analog power supply voltage supplied from the analog power supply circuit. When the operation mode is set to the first mode, the analog power supply circuit is activated faster than that in the second mode and supplies the analog power supply voltage to the analog circuit. On the other hand, when the operation mode is set to the second mode, the analog power supply circuit supplies the analog power supply voltage to the analog circuit with lower noise than that in the first mode. In this manner, in the situation in which power supply with fast activation is requested more than that with low noise, the analog power supply circuit operates in the first mode, and thereby, may address the situation. On the other hand, in the situation in which power supply with low noise is requested more than that with fast activation, the analog power supply circuit operates in the second mode, and thereby, may address the situation. Therefore, the circuit device that may address both the situation in which power supply with fast activation is requested and the situation in which power supply with low noise is requested can be provided.

Further, in the embodiment, the analog power supply circuit may include the lowpass filter for noise reduction, the first mode may be the mode in which the signal does not pass through the lowpass filter, the second mode may be the mode in which the signal passes through the lowpass filter, and the analog power supply circuit may generate the analog power supply voltage based on the signal.

As described above, the first mode in which the signal does not pass through the lowpass filter is provided, and thereby, the analog power supply circuit may follow the load current fluctuation in the analog circuit and fast activation of the analog power supply circuit can be performed. Further, the second mode in which the signal passes through the lowpass filter is provided, and thereby, the lowpass filtered analog power supply voltage may be output and low-noise power supply can be performed.

Further, the circuit device of the embodiment includes the digital circuit, the digital power supply circuit that supplies the digital power supply voltage to the digital circuit, the analog circuit, and the analog power supply circuit that supplies the analog power supply voltage to the analog circuit. The analog power supply circuit has the amplifier circuit having the first input terminal to which the reference voltage is input, the transistor provided between the first power supply node and the output node of the analog power supply voltage, and the lowpass filter provided between the node of the output terminal of the amplifier circuit and the node of the gate of the transistor. Further, the analog power supply circuit includes the switch provided in parallel to the lowpass filter between the node of the output terminal of the amplifier circuit and the node of the gate of the transistor, and the voltage divider circuit provided between the output node of the analog power supply voltage and the second power supply node and outputting the voltage formed by division of the analog power supply voltage to the second input terminal of the amplifier circuit. The analog power supply circuit has a first mode and a second mode as operation modes, and the switch is turned on in the first mode and turned off in the second mode.

According to the embodiment, the digital circuit operates by the digital power supply voltage supplied from the digital power supply circuit, and the analog circuit operates by the analog power supply voltage supplied from the analog power supply circuit. The lowpass filter and the switch are provided in parallel between the node of the output terminal of the amplifier circuit and the node of the gate of the transistor of the analog power supply circuit. In the first mode, the switch is turned on and the output signal of the amplifier circuit is input to the gate of the transistor via the turned on switch, and fast activation of the analog power supply circuit can be performed. On the other hand, in the second mode, the switch is turned off and the output signal of the amplifier circuit passes through the lowpass filter, and the lowpass-filtered output signal is input to the gate of the transistor. Thereby, the analog power supply circuit may generate the low-noise power supply voltage. In this manner, in the situation in which the power supply with fast activation is requested more than that with low noise, the analog power supply circuit operates in the first mode, and thereby, may address the situation. On the other hand, in the situation in which power supply with low noise is requested more than that with fast activation, the analog power supply circuit operates in the second mode, and thereby, may address the situation. Therefore, the circuit device that may address both the situation in which power supply with fast activation is requested and the situation in which power supply with low noise is requested can be provided.

In the embodiment, the analog power supply circuit may supply the analog power supply voltage to the analog circuit in the first mode, and then, supply the analog power supply voltage to the analog circuit in the second mode.

In the above described manner, the analog power supply circuit is set in the first mode, and thereby, may start supply of the analog power supply voltage in the short time. Then, after the start of supply of the analog power supply voltage, the circuit is set in the second mode, and thereby, may supply the low-noise analog power supply voltage to the analog circuit.

In the embodiment, the operation mode of the analog power supply circuit may be switched from the first mode to the second mode after the digital power supply circuit supplies the digital power supply voltage to the digital circuit.

In the above described manner, the operation mode of the analog power supply circuit is switched from the first mode to the second mode after the digital power supply voltage is supplied to the digital circuit and the control processing by the digital circuit is enabled, and thereby, the precise control processing by the digital circuit may be realized.

In the embodiment, the analog circuit may include the oscillation circuit that generates the oscillation signal by oscillation, and the analog power supply circuit may supply the analog power supply voltage to the oscillation circuit in the first mode, and then, supply the analog power supply voltage to the oscillation circuit in the second mode.

In the above described manner, power supply by the analog power supply circuit is started in the fast activation time in the first mode, then the low-noise analog power supply voltage is supplied to the oscillation circuit in the second mode, and thereby, the precise oscillation operation of the oscillation circuit may be realized.

In the embodiment, the analog circuit may include the PLL circuit that generates the clock signal, and the analog power supply circuit may supply the analog power supply voltage to the PLL circuit in the first mode, and then, supply the analog power supply voltage to the PLL circuit in the second mode.

In the above described manner, the analog power supply voltage is supplied to the PLL circuit in the first mode, and thereby, the PLL operation of the PLL circuit may be activated fast. Then, the analog power supply circuit supplies the analog power supply voltage to the PLL circuit in the second mode, and thereby, the low-noise clock signal may be output from the PLL circuit.

In the embodiment, the analog power supply circuit may be switched from the second mode to the first mode in the frequency change period of the PLL circuit, and the analog power supply circuit may be switched from the first mode to the second mode after the end of the frequency change period.

In the above described manner, the frequency change of the PLL circuit may be performed in the short time and the low-noise clock signal locked at the changed frequency may be output from the PLL circuit.

In the embodiment, the analog circuit may include the output circuit that outputs the output signal when supplied with the analog power supply voltage from the analog power supply circuit, and the output circuit may output the output signal after the analog power supply circuit is switched from the first mode to the second mode.

In the above described manner, the analog power supply circuit is switched from the first mode to the second mode and supplies the low-noise analog power supply voltage, and thereby, the output circuit is enabled to output the low-noise output signal, and then, the output circuit outputs the output signal.

In the embodiment, the timing control circuit that sets the operation mode of the analog power supply circuit to the first mode or the second mode may be provided.

In the above described manner, under control of the timing control circuit, the operation mode of the analog power supply circuit may be set in the first mode to enable fast activation and the operation mode may be set to the second mode to enable low-noise power supply.

In the embodiment, the digital power supply circuit may have the amplifier circuit having the first input terminal to which the reference voltage is input, the transistor provided between the first power supply node and the output node of the digital power supply voltage, and the voltage divider circuit provided between the output node of the digital power supply voltage and the second power supply node and outputting the voltage formed by division of the digital power supply voltage to the second input terminal of the amplifier circuit.

According to the digital power supply circuit having the above described configuration, the circuit may be activated fast and supply the digital power supply voltage to the digital circuit at the rise of the power supply voltage.

Further, the embodiment is the power supply circuit that supplies the power supply voltage, and includes the amplifier circuit having the first input terminal to which the reference voltage is input, the transistor provided between the first power supply node and the output node of the power supply voltage, and the lowpass filter provided between the node of the output terminal of the amplifier circuit and the node of the gate of the transistor. Further, the power supply circuit includes the switch provided in parallel to the lowpass filter between the node of the output terminal of the amplifier circuit and the node of the gate of the transistor, and the voltage divider circuit provided between the output node of the power supply voltage and the second power supply node and outputting the voltage formed by division of the power supply voltage to the second input terminal of the amplifier circuit.

According to the embodiment, the lowpass filter and the switch are provided in parallel between the node of the output terminal of the amplifier circuit and the node of the gate of the transistor. In the first mode, for example, the output signal of the amplifier circuit may be input to the gate of the transistor via the switch, and fast activation of the power supply circuit can be performed. On the other hand, in the second mode, the output signal of the amplifier circuit passes through the lowpass filter, and the lowpass-filtered output signal is input to the gate of the transistor. Thereby, the power supply circuit may generate the low-noise power supply voltage.

The embodiment relates to the oscillator including the vibrator and the above described circuit device having the oscillation circuit that oscillates the vibrator.

Further, the embodiment relates to the electronic apparatus including the above described circuit device.

Furthermore, the embodiment relates to the vehicle including the above described circuit device.

As above, the embodiment is explained in detail, however, a person skilled in the art could readily understand that many modifications can be made without substantially departing from the new matter and effects of the present disclosure. Therefore, all of the modified examples fall within the range of the present disclosure. For example, in the specification or the drawings, the terms at least once used with different terms in broader senses or the same senses may be replaced by the different terms in any part of the specification or the drawings. Further, all combinations of the embodiment and the modified examples also fall within the range of the present disclosure. The configurations, operations, etc. of the circuit device, power supply circuit, oscillator, electronic apparatus, and vehicle are not limited to those described in the embodiment and various modifications can be made.

What is claimed is:

1. A circuit device comprising:
   a digital circuit;
   a digital power supply circuit that supplies a digital power supply voltage to the digital circuit;
   an analog circuit; and
   an analog power supply circuit that supplies an analog power supply voltage to the analog circuit, the analog power supply circuit including a lowpass filter for noise reduction, wherein
   the analog power supply circuit has a first mode and a second mode as operation modes,
   the first mode is a mode in which activation of power supply is faster than that in the second mode,
   the second mode is a mode in which power supply is performed with lower noise than that in the first mode, and
   the first mode is a mode in which a signal does not pass through the lowpass filter, the second mode is a mode in which the signal passes through the lowpass filter, and the analog power supply circuit generates the analog power supply voltage based on the signal.

2. The circuit device according to claim 1, wherein the analog power supply circuit supplies the analog power supply voltage to the analog circuit in the first mode, and then, supplies the analog power supply voltage to the analog circuit in the second mode.

3. The circuit device according to claim 1, wherein an operation mode of the analog power supply circuit is switched from the first mode to the second mode after the digital power supply circuit supplies the digital power supply voltage to the digital circuit.

4. The circuit device according to claim 1, wherein the analog circuit includes an oscillation circuit that generates an oscillation signal, and the analog power supply circuit supplies the analog power supply voltage to the oscillation circuit in the first mode, and then, supplies the analog power supply voltage to the oscillation circuit in the second mode.

5. The circuit device according to claim 1, wherein the analog circuit includes a PLL circuit that generates a clock signal, and the analog power supply circuit supplies the analog power supply voltage to the PLL circuit in the first mode, and then, supplies the analog power supply voltage to the PLL circuit in the second mode.

6. The circuit device according to claim 5, wherein the analog power supply circuit is switched from the second mode to the first mode in a frequency change period of the PLL circuit, and the analog power supply circuit is switched from the first mode to the second mode after an end of the frequency change period.

7. The circuit device according to claim 1, wherein the analog circuit includes an output circuit that outputs an output signal when supplied with the analog power supply voltage from the analog power supply circuit, and the output circuit outputs the output signal after the analog power supply circuit is switched from the first mode to the second mode.

8. The circuit device according to claim 1, further comprising:
a timing control circuit that sets an operation mode of the analog power supply circuit to the first mode or the second mode.

9. The circuit device according to claim 1, wherein the digital power supply circuit includes:
an amplifier circuit having a first input terminal to which a reference voltage is input;
a transistor provided between a first power supply node and an output node of the digital power supply voltage; and
a voltage divider circuit provided between the output node of the digital power supply voltage and a second power supply node and outputting a voltage formed by division of the digital power supply voltage to a second input terminal of the amplifier circuit.

10. An oscillator comprising:
a vibrator; and
the circuit device according to claim 1 including an oscillation circuit that oscillates the vibrator.

11. An electronic apparatus comprising the circuit device according to claim 1.

12. A vehicle comprising the circuit device according to claim 1.

13. A circuit device comprising:
a digital circuit;
a digital power supply circuit that supplies a digital power supply voltage to the digital circuit;
an analog circuit; and
an analog power supply circuit that supplies an analog power supply voltage to the analog circuit, wherein
the analog power supply circuit includes:
an amplifier circuit having a first input terminal to which a reference voltage is input;
a transistor provided between a first power supply node and an output node of the analog power supply voltage;
a lowpass filter provided between a node of an output terminal of the amplifier circuit and a node of a gate of the transistor;
a switch provided in parallel to the lowpass filter between the node of the output terminal of the amplifier circuit and the node of the gate of the transistor; and
a voltage divider circuit provided between the output node of the analog power supply voltage and a second power supply node and outputting a voltage formed by division of the analog power supply voltage to a second input terminal of the amplifier circuit,
the analog power supply circuit has a first mode and a second mode as operation modes,
the switch is turned on in the first mode and turned off in the second mode, and
the first mode is a mode in which a signal does not pass through the lowpass filter, the second mode is a mode in which the signal passes through the lowpass filter, and the analog power supply circuit generates the analog power supply voltage based on the signal.

14. An analog power supply circuit having a first mode and a second mode as operation modes, and that supplies an analog power supply voltage to an analog circuit, the analog power supply circuit comprising:
an amplifier circuit having a first input terminal to which a reference voltage is input;
a transistor provided between a first power supply node and an output node of the analog power supply voltage;
a lowpass filter provided between a node of an output terminal of the amplifier circuit and a node of a gate of the transistor;
a switch provided in parallel to the lowpass filter between the node of the output terminal of the amplifier circuit and the node of the gate of the transistor; and
a voltage divider circuit provided between the output node of the analog power supply voltage and a second power supply node and outputting a voltage formed by division of the analogy power supply voltage to a second input terminal of the amplifier circuit, wherein
the first mode is a mode in which activation of power supply is faster than that in the second mode, and in which a signal does not pass through the lowpass filter, and
the second mode is a mode in which power supply is performed with lower noise than that in the first mode, and in which the signal passes through the lowpass filter, and the analog power supply circuit generates the analog power supply voltage based on the signal.

* * * * *